US010609702B2

(12) United States Patent
Tomeba et al.

(10) Patent No.: US 10,609,702 B2
(45) Date of Patent: Mar. 31, 2020

(54) BASE STATION APPARATUS, TERMINAL APPARATUS, AND COMMUNICATION METHOD

(71) Applicant: SHARP KABUSHIKI KAISHA, Sakai, Osaka (JP)

(72) Inventors: Hiromichi Tomeba, Sakai (JP); Ryota Yamada, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/072,447

(22) PCT Filed: Jan. 24, 2017

(86) PCT No.: PCT/JP2017/002363
§ 371 (c)(1),
(2) Date: Jul. 24, 2018

(87) PCT Pub. No.: WO2017/130970
PCT Pub. Date: Aug. 3, 2017

(65) Prior Publication Data
US 2019/0053205 A1 Feb. 14, 2019

(30) Foreign Application Priority Data
Jan. 26, 2016 (JP) ................. 2016-012184

(51) Int. Cl.
*H04W 4/00* (2018.01)
*H04W 72/04* (2009.01)
(Continued)

(52) U.S. Cl.
CPC ........... *H04W 72/042* (2013.01); *H04L 5/003* (2013.01); *H04L 5/005* (2013.01); *H04L 5/0044* (2013.01);
(Continued)

(58) Field of Classification Search
CPC ........... H04W 72/042; H04W 72/0446; H04W 28/06; H04L 5/0044; H04L 5/005; H04L 5/143; H04L 27/2676
(Continued)

(56) References Cited

U.S. PATENT DOCUMENTS

2015/0078221 A1   3/2015 Seo et al.
2015/0289220 A1*  10/2015 Kim ............... H04W 56/00
                                              370/336
(Continued)

FOREIGN PATENT DOCUMENTS

CN    106911438 A    6/2017
JP    2014-060638 A  4/2014
(Continued)

OTHER PUBLICATIONS

IMT Vision—Framework and overall objectives of the future development of IMT for2020 and beyond, Recommendation ITU-R M.2083-0, Sep. 2015.
(Continued)

*Primary Examiner* — Thai D Hoang
(74) *Attorney, Agent, or Firm* — ScienBiziP, P.C.

(57) ABSTRACT

Provided are a base station apparatus, a terminal apparatus, and a communication method that achieve a radio access network capable of being flexibly compatible with various requirements. The base station apparatus according to an aspect of the present invention includes a transmission unit configured to generate a transmit signal based on a frame format in which a radio parameter is configurable, and configured to notify the terminal apparatus of information indicating the radio parameter configured in the frame format. The terminal apparatus according to an aspect of the present invention includes a reception unit configured to acquire information indicating a radio parameter configured in a frame format, and configured to demodulate a signal generated based on the frame format, based on the radio parameter.

7 Claims, 9 Drawing Sheets

(51) Int. Cl.
*H04L 5/00* (2006.01)
*H04W 28/06* (2009.01)
*H04L 27/26* (2006.01)
*H04L 5/14* (2006.01)

(52) U.S. Cl.
CPC ......... *H04L 27/2676* (2013.01); *H04W 28/06* (2013.01); *H04W 72/0446* (2013.01); *H04L 5/143* (2013.01)

(58) Field of Classification Search
USPC .................................. 370/328–330, 335–349
See application file for complete search history.

(56) References Cited

U.S. PATENT DOCUMENTS

2018/0054786 A1* 2/2018 Yamada ............... H04L 7/04
2018/0249433 A1* 8/2018 Shin .................... H04L 5/0005
2018/0278388 A1 9/2018 Liu et al.
2018/0310300 A1* 10/2018 Lin ...................... H04B 7/0456
2019/0082404 A1* 3/2019 Cheng .................. H04L 27/26
2019/0116007 A1* 4/2019 Yi ......................... H04W 4/42

FOREIGN PATENT DOCUMENTS

JP   2015-518679 A    7/2015
WO  2009/084931 A1   7/2009

OTHER PUBLICATIONS

Huawei, HiSilicon, Overview of short TTI, 3GPP TSG-RAN WG1 Meeting #83 R1-156458, [online], Nov. 7, 2015, pp. 1-5, [retrieved on Jun. 29, 2017], Retrieved fromthe Internet<URL:http://www.3gpp.org/ftp/tsg_ran/WG1_RL1/TSGR1_83/Docs/R1-156458. zip>.
Ericsson, 5G-key component of the Networked Society, 3GPP RAN Workshop on5G RWS-150009, [online], Sep. 3, 2015, pp. 28, 34, [retrieved on Jun. 29, 2017],Retrieved from the Internet<URL:http://www.3gpp.org/ftp/workshop/2015-09-17_18_RAN_5G/Docs/RWS-150009. zip>.

* cited by examiner

BASE STATION APPARATUS, TERMINAL APPARATUS, AND COMMUNICATION METHOD

TECHNICAL FIELD

The present invention relates to a base station apparatus, a terminal apparatus, and a communication method.

BACKGROUND ART

In a communication system such as Long Term Evolution (LTE) or LTE-Advanced (LTE-A) standardized by the Third Generation Partnership Project (3GPP), the communication area can be widened by taking a cellular configuration in which areas covered by base station apparatuses (base stations, transmission stations, transmission points, downlink transmission devices, uplink reception devices, a group of transmit antennas, a group of transmit antenna ports, component carriers, eNodeB, access points, APs) or transmission stations equivalent to the base station apparatuses are arranged in the form of multiple cells (Cells) being linked together. Terminal apparatuses (reception stations, reception points, downlink reception devices, uplink transmission devices, a group of receive antennas, a group of receive antenna ports, UE, stations, STAs) are connected to the base station apparatus. In such a cellular configuration, frequency efficiency can be improved by using the same frequency among neighboring cells or sectors.

In LTE/LTE-A, frame formats are defined with respect to a frequency division duplex, a time division duplex, and a licensed assisted access, respectively. For example, the base station apparatus and the terminal apparatus of LTE/LTE-A using the frequency division duplex can always communicate using a common frame format without depending on a communication bandwidth or the like.

Additionally, with the aim of starting a commercial service at around 2020, research and development activities relating to a fifth generation mobile radio communication system (5G system) are actively performed. International Telecommunication Union Radio communications Sector (ITU-R) that is an international standardization organization recently reported a vision recommendation relating to a standard scheme of the 5G system (International mobile telecommunication—2020 and beyond: IMT-2020) (see NPL 1).

In the vision recommendation, various use cases to which the 5G system provides a communication service are classified into three large usage scenarios (Enhanced mobile broadband (EMBB), Enhanced Massive machine type communication (eMTC), Ultra-reliable and low latency communication (URLLC)). Additionally, the vision recommendation presents eight indexes (Peak data rate, User experienced data rate, Spectrum efficiency, Mobility, Latency, Connection density, Network energy efficiency, Area traffic capacity) as requirements (Capabilities) of the 5G system. However, the vision recommendation also points out that, for the 5G system, it is not necessary to simultaneously satisfy all the requirements, and it is sufficient to satisfy the requirements for each of the usage scenarios. The requirements of each of the use cases/usage scenarios are of course different, and thus radio performance provided by a radio access network included in the 5G system is required to dynamically change every moment.

CITATION LIST

Non-Patent Literature

NPL 1: "IMT Vision—Framework and overall objectives of the future development of IMT for 2020 and beyond", Recommendation ITU-R M.2083-0, September 2015.

DISCLOSURE OF THE INVENTION

Problems to be Solved by the Invention

However, in general, in a radio communication system, in view of complexity of the system, a radio interface uses the common frame format in many cases. In the existing LTE/LTE-A as well, one common frame format is defined for each duplex scheme. However, by the common frame format, there is a limit on the radio access network responding to the requirement that changes every moment. However, uselessly increasing the types of the frame format results in increasing the complexity of the system and overhead, and reducing the capability of the radio access network.

The present invention has been made in view of the above-described circumstances, and an object thereof is to provide a base station apparatus, a terminal apparatus, and a communication method that achieve a radio access network capable of being flexibly compatible with various requirements.

Means for Solving the Problems

To address the above-mentioned drawbacks, a base station apparatus, a terminal apparatus, and a communication method according to an aspect of the present invention are configured as follows.

(1) That is, a base station apparatus according to an aspect of the present invention is a base station apparatus for communicating with a terminal apparatus, the base station apparatus includes a transmission unit configured to generate a transmit signal based on a frame format in which a radio parameter is configurable, and configured to notify the terminal apparatus of information indicating the radio parameter configured in the frame format.

(2) Additionally, a base station apparatus according to an aspect of the present invention is the base station apparatus according to the above-described (1) in which the frame format may include a common reference signal resource and a data signal resource, and the common reference signal resource and the data signal resource may be sequentially arranged in a time domain.

(3) Additionally, a base station apparatus according to an aspect of the present invention is the base station apparatus according to the above-described (2) in which the transmission unit may generate the transmit signal based on a frame format in which at least one resource included in the frame format is subjected to aggregation in the time domain or a frequency domain.

(4) Additionally, a base station apparatus according to an aspect of the present invention is the base station apparatus according to the above-described (3) in which the transmission unit may provide a non-transmission section to the transmit signal generated based on the frame format including the aggregation.

(5) Additionally, a base station apparatus according to an aspect of the present invention is the base station apparatus according to any one of the above-described (2) to (4) in which the transmission unit may selectively or simultaneously use a first frame format having a different resource arrangement from a resource arrangement of the frame format and a second frame format being the frame format to generate the transmit signal.

(6) Additionally, a base station apparatus according to an aspect of the present invention is the base station apparatus according to the above-described (1) in which the radio parameter may include a subcarrier spacing.

(7) Additionally, a base station apparatus according to an aspect of the present invention is the base station apparatus according to the above-described (3), the base station apparatus may transmit a configuration relating to the aggregation to the terminal apparatus.

(8) Additionally, a terminal apparatus according to an aspect of the present invention is a terminal apparatus for communicating with a base station apparatus, the terminal apparatus includes a reception unit configured to acquire information indicating a radio parameter configured in a frame format, and configured to demodulate a signal generated based on the frame format, based on the radio parameter.

(9) Additionally, a terminal apparatus according to an aspect of the present invention is the terminal apparatus according to the above-described (8) in which the signal demodulated by the reception unit may be generated by selectively or simultaneously using a first frame format having a different resource arrangement from a resource arrangement of the frame format and a second frame format being the frame format.

(10) Additionally, a terminal apparatus according to an aspect of the present invention is the terminal apparatus according to the above-described (9) in which the reception unit may perform blind detection for whether the signal is generated based on the first frame format or generated based on the second frame format.

(11) Additionally, a terminal apparatus according to an aspect of the present invention is the terminal apparatus according to the above-described (10) in which a method of the blind detection may be a synchronization processing method performed by the reception unit or an acquiring method of a broadcast signal performed by the reception unit.

(12) Additionally, a communication method according to an aspect of the present invention is a communication method of a base station apparatus for communicating with a terminal apparatus, the communication method includes the steps of: generating a transmit signal based on a frame format in which a radio parameter is configurable; and notifying the terminal apparatus of information indicating the radio parameter configured in the frame format.

(13) Additionally, a communication method according to an aspect of the present invention is a communication method of a terminal apparatus for communicating with a base station apparatus, the communication method includes the steps of: acquiring information indicating a radio parameter configured in a frame format; and demodulating a signal generated based on the frame format, based on the radio parameter.

Effects of the Invention

According to an aspect of the present invention, a radio access network capable of being flexibly compatible with various requirements is provided, and it is thus possible to efficiently provide a radio communication service to various use cases and usage scenarios with different requirements.

MODE FOR CARRYING OUT THE INVENTION

A communication system according to the present embodiment includes a base station apparatus (a transmission device, cells, a transmission point, a group of transmit antennas, a group of transmit antenna ports, component carriers, eNodeB, an access point, an AP, a radio router, a repeater, a communication device) and terminal apparatuses (a terminal, a mobile terminal, a reception point, a reception terminal, a reception device, a group of receive antennas, a group of receive antenna ports, UE, a station, an STA).

According to the present embodiment, "X/Y" includes the meaning of "X or Y". According to the present embodiment, "X/Y" includes the meaning of "X and Y". According to the present embodiment, "X/Y" includes the meaning of "X and/or Y".

1. First Embodiment

Figure 1:
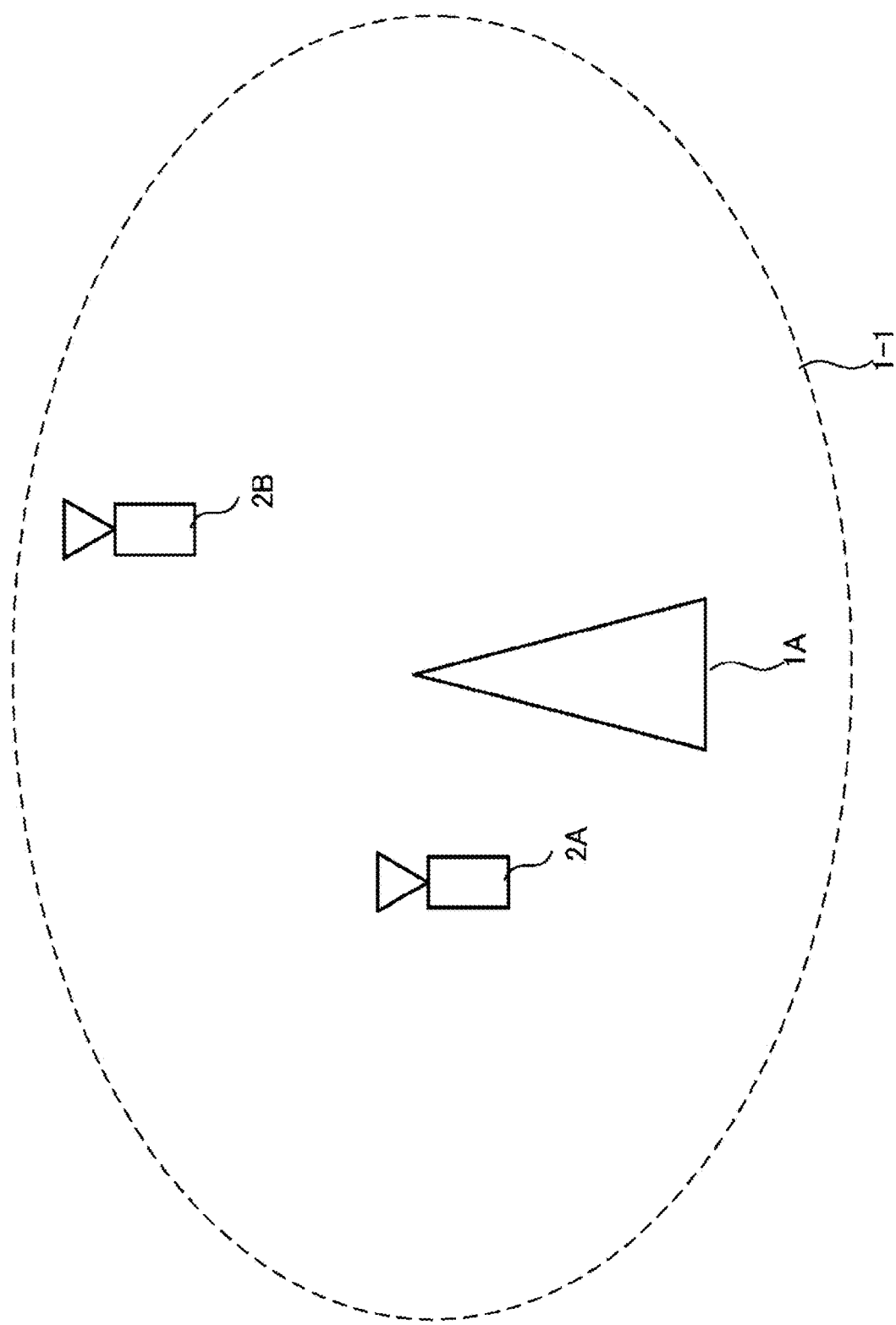
FIG. 1 is a diagram illustrating an example of a communication system according to an aspect of the present invention.

FIG. 1 is a diagram illustrating an example of a communication system according to the present embodiment. As illustrated in FIG. 1, the communication system according to the present embodiment includes a base station apparatus 1A and terminal apparatuses 2A and 2B. Coverage 1-1 is a range (a communication area) in which the base station apparatus 1A can connect to the terminal apparatuses. Note that, the communication system according to the present embodiment can include multiple base station apparatuses and three or more terminal apparatuses.

With respect to FIG. 1, the following uplink physical channels are used for uplink radio communication from the terminal apparatuses 2 to the base station apparatus 1A. The uplink physical channels are used for transmission of information output from higher layers.

Physical Uplink Control CHannel (PUCCH)
Physical Uplink Shared CHannel (PUSCH)
Physical Random Access CHannel (PRACH)

The PUCCH is used for transmission of Uplink Control Information (UCI). The Uplink Control Information includes a positive ACKnowledgement (ACK) or a Negative ACKnowledgement (NACK) (ACK/NACK) for downlink data (a downlink transport block or a Downlink-Shared CHannel (DL-SCH)). ACK/NACK for the downlink data is also referred to as HARQ-ACK or HARQ feedback.

Here, the Uplink Control Information includes Channel State Information (CSI) for the downlink. The Uplink Control Information includes a Scheduling Request (SR) used to request an Uplink-Shared CHannel (UL-SCH) resource. The Channel State Information refers to a Rank Indicator RI specifying a suited spatial multiplexing number, a Precoding Matrix Indicator PMI specifying a suited precoder, a Channel Quality Indicator CQI specifying a suited transmission rate, and the like.

The Channel Quality Indicator CQI (hereinafter, referred to as a CQI value) can be a suited modulation scheme (e.g., QPSK, 16QAM, 64QAM, 256QAM, or the like) and a suited code rate in a predetermined band (details of which will be described later). The CQI value can be an index (CQI Index) determined by the above change scheme, code rate, and the like. The CQI value can take a value determined beforehand in the system.

The Rank Indicator and the Precoding Quality Indicator can take the values determined beforehand in the system. Each of the Rank Indicator, the Precoding Matrix Indicator, and the like can be an index determined by the number of spatial multiplexing, Precoding Matrix information, or the like. Note that values of the Rank Indicator, the Precoding Matrix Indicator, and the Channel Quality Indicator CQI are collectively referred to as CSI values.

PUSCH is used for transmission of uplink data (an uplink transport block, UL-SCH). Furthermore, PUSCH may be used for transmission of ACK/NACK and/or Channel State Information along with the uplink data. In addition, PUSCH may be used to transmit the Uplink Control Information only.

PUSCH is used to transmit an RRC message. The RRC message is a signal/information that is processed in a Radio Resource Control (RRC) layer. Further, PUSCH is used to transmit an MAC Control Element (CE). Here, MAC CE is a signal/information that is processed (transmitted) in a Medium Access Control (MAC) layer.

For example, a power headroom may be included in MAC CE and may be reported via PUSCH. In other words, a MAC CE field may be used to indicate a level of the power headroom.

The PRACH is used to transmit a random access preamble.

In the uplink radio communication, an UpLink Reference Signal (UL RS) is used as an uplink physical signal. The uplink physical signal is not used for transmission of information output from higher layers, but is used by the physical layer. The Uplink Reference Signal includes a DeModulation Reference Signal (DMRS) and a Sounding Reference Signal (SRS).

The DMRS is associated with transmission of the PUSCH or the PUCCH. For example, the base station apparatus 1A uses DMRS in order to perform channel compensation of PUSCH or PUCCH. The SRS is not associated with the transmission of the PUSCH or the PUCCH. For example, the base station apparatus 1A uses SRS to measure an uplink channel state. The base station apparatus 1A can report SRS configuration information with signalling of a higher layer or a DCI format, which will be described later. The base station apparatus 1A can report DMRS configuration information with the signalling of the higher layer or the DCI format, which will be described later.

For the SRS, multiple ways of a trigger are defined. For example, a trigger type 0 in which the trigger is performed by the signalling of the higher layer and a trigger type 1 in which the trigger is performed by downlink control information, which will be described later, are defined.

The SRS includes a Cell specific SRS (Common SRS) and a UE-specific SRS (Dedicated SRS). The UE-specific SRS includes the SRS that is periodically transmitted (UR-specific periodic SRS) and the SRS that is aperiodically transmitted based on the trigger (UE-specific aperiodic SRS).

For the Common SRS, by the signalling of the higher layer or the downlink control information, which will be described later, a transmission bandwidth (srs-BandwidthConfig) and a subframe for transmission (srs-SubframeConfig) are specified. Additionally, in a case that a prescribed parameter (for example, ackNackSRS-SimultaneousTransmission) is False, the Commmon SRS is not transmitted by a subframe including the PUCCH including at least one of the HARQ-ACK and the SR. On the other hand, in a case that the prescribed parameter (for example, ackNackSRS-SimultaneousTransmission) is True, the Commmon SRS can be transmitted by the subframe including the PUCCH including at least one of the HARQ-ACK and the SR.

For the Dedicated SRS, by the signalling of the higher layer or the downlink control information, which will be described later, a transmission bandwidth, a hopping bandwidth (srs-HoppingBandwidth), a frequency allocation start position (freqDomainPosition), a transmission period (Duration) (Single transmission or indefinite transmission), a transmission cycle (srs-ConfigIndex), a cyclic shift amount provided to an SRS signal sequence (cyclicShift), an SRS position formed in a comb-teeth shape (transmissionComb) are configured.

The SRS can be transmitted from multiple antenna ports. The number of the transmit antenna ports are configured by the signalling of the higher layer. The UE in which the SRS transmission in the multiple antenna ports is configured has to transmit the SRSs from all the configured transmit antenna ports to the serving cell by one SC-FDMA symbol in the same subframe. In this case, for all the SRSs transmitted from the configured transmit antenna ports, the same transmission bandwidth and frequency allocation start position are configured.

The UE in which multiple Transmission advance groups (TAGs) are not configured should not transmit the SRS unless the SRS and the PUSCH overlap in the same symbol.

For a TDD serving cell, in a case that one SC-FDMA symbol is included in an UpPTS of the serving cell, the UE can use the SC-FDMA symbol for the SRS transmission. In a case that two SC-FDMA symbols are included in the UpPTS of the serving cell, the UE can use both the two SC-FDMA symbols for the SRS transmission. Additionally, in the SRS of the trigger type 0, for the same UE, both the two SC-FDMA symbols can be configured for the SRS.

In FIG. 1, the following downlink physical channels are used for the downlink radio communication from the base station apparatus 1A to the terminal apparatus 2A. The downlink physical channels are used for transmission of information output from higher layers.

Physical Broadcast CHannel (PBCH)
Physical Control Format Indicator CHannel (PCFICH)
Physical Hybrid automatic repeat request Indicator CHannel (PHICH)
Physical Downlink Control CHannel (PDCCH)
Enhanced Physical Downlink Control CHannel (EPDCCH)
Physical Downlink Shared CHannel (PDSCH)

PBCH is used for broadcasting a Master Information Block (MIB, a Broadcast CHannel (BCH)) that is shared by the terminal apparatuses. PCFICH is used for transmission of information indicating a region (e.g., the number of OFDM symbols) to be used for transmission of PDCCH.

PHICH is used for transmission of ACK/NACK with respect to uplink data (a transport block, a codeword) received by the base station apparatus 1A. In other words, PHICH is used for transmission of a HARQ indicator (HARQ feedback) indicating ACK/NACK with respect to the uplink data. Note that ACK/NACK is also called HARQ-ACK. The terminal apparatus 2A reports ACK/NACK having been received to a higher layer. ACK/NACK refers to ACK indicating a successful reception, NACK indicating an unsuccessful reception, and DTX indicating that no corresponding data is present. In a case that PHICH for uplink data is not present, the terminal apparatus 2A reports ACK to a higher layer.

The PDCCH and the EPDCCH are used for transmission of Downlink Control Information (DCI). Here, multiple DCI formats are defined for transmission of the downlink control information. In other words, a field for the downlink control information is defined in a DCI format and is mapped to information bits.

For example, as a DCI format for the downlink, DCI format 1A to be used for the scheduling of one PDSCH in one cell (transmission of a single downlink transport block) is defined.

For example, the DCI format for the downlink includes downlink control information such as information of PDSCH resource allocation, information of a Modulation and Coding Scheme (MCS) for the PDSCH, a TPC command for the PUCCH, and the like. Here, the DCI format for the downlink is also referred to as downlink grant (or downlink assignment).

Furthermore, for example, as a DCI format for the uplink, DCI format 0 to be used for the scheduling of one PUSCH in one cell (transmission of a single uplink transport block) is defined.

For example, the DCI format for the uplink includes uplink control information such as information of PUSCH resource allocation, information of the MCS for the PUSCH, a TPC command for the PUSCH, and the like. Here, the DCI format for the uplink is also referred to as uplink grant (or uplink assignment).

Further, the DCI format for the uplink can be used to request (CSI request) downlink Channel State Information (CSI), which is also called reception quality information. The Channel State Information refers to the Rank Indicator (RI) specifying a suited number of spatial multiplexing, the Precoding Matrix Indicator (PMI) specifying a suited precoder, the Channel Quality Indicator (CQI) specifying a suited transmission rate, Precoding Type Indicator (PTI) and the like.

The DCI format for the uplink can be used for a configuration indicating an uplink resource to which a CSI feedback report is mapped, the CSI feedback report being fed back to the base station apparatus by the terminal apparatus. For example, the CSI feedback report can be used for a configuration indicating an uplink resource for periodically reporting Channel State Information (periodic CSI). The CSI feedback report can be used for a mode configuration (CSI report mode) to periodically report the Channel State Information.

For example, the CSI feedback report can be used for a configuration indicating an uplink resource to report aperiodic Channel State Information (aperiodic CSI). The CSI feedback report can be used for a mode configuration (CSI report mode) to aperiodically report the Channel State Information. The base station apparatus can configure any one of the periodic CSI feedback report and the aperiodic CSI feedback report. In addition, the base station apparatus can configure both the periodic CSI feedback report and the aperiodic CSI feedback report.

The DCI format for the uplink can be used for a configuration indicating a type of the CSI feedback report that is fed back to the base station apparatus by the terminal apparatus. The type of the CSI feedback report includes wideband CSI (e.g., Wideband CQI), narrowband CSI (e.g., Subband CQI), and the like.

In a case where a PDSCH resource is scheduled in accordance with the downlink assignment, the terminal apparatus receives downlink data on the scheduled PDSCH. In a case where a PUSCH resource is scheduled in accordance with the uplink grant, the terminal apparatus transmits uplink data and/or uplink control information on the scheduled PUSCH.

PDSCH is used for transmission of downlink data (a downlink transport block, DL-SCH). PDSCH is used to transmit a system information block type 1 message. The system information block type 1 message is cell-specific information.

The PDSCH is used to transmit a system information message. The system information message includes a system information block X other than the system information block type 1. The system information message is cell-specific information.

PDSCH is used to transmit an RRC message. Here, the RRC message transmitted from the base station apparatus may be shared by multiple terminal apparatuses in a cell. Further, the RRC message transmitted from the base station apparatus 1A may be a dedicated message to a given terminal apparatus 2 (also referred to as dedicated signaling). In other words, user-equipment-specific information (unique to user equipment) is transmitted using a message dedicated to the given terminal apparatus. PDSCH is used for transmission of MAC CE.

Here, the RRC message and/or MAC CE is also referred to as higher layer signaling.

PDSCH can be used to request downlink channel state information. PDSCH can be used for transmission of an uplink resource to which a CSI feedback report is mapped, the CSI feedback report being fed back to the base station apparatus by the terminal apparatus. For example, the CSI feedback report can be used for a configuration indicating an uplink resource for periodically reporting Channel State Information (periodic CSI). The CSI feedback report can be used for a mode configuration (CSI report mode) to periodically report the Channel State Information.

The type of the downlink CSI feedback report includes wideband CSI (e.g., Wideband CSI) and narrowband CSI (e.g., Subband CSI). The wideband CSI calculates one piece of Channel State Information for the system band of a cell. The narrowband CSI divides the system band in predetermined units, and calculates one piece of Channel State Information for each division.

In the downlink radio communication, a Synchronization signal (SS) and a DownLink Reference Signal (DL RS) are used as downlink physical signals. The downlink physical signals are not used for transmission of information output from the higher layers, but are used by the physical layer.

The Synchronization signal is used for the terminal apparatus to be synchronized to frequency and time domains in the downlink. The Downlink Reference Signal is used for the terminal apparatus to perform channel compensation on a downlink physical channel. For example, the Downlink Reference Signal is used for the terminal apparatus to calculate the downlink Channel State Information.

Here, the Downlink Reference Signals include a Cell-specific Reference Signal (CRS), a UE-specific Reference Signal (URS) or a terminal-specific reference signal, a DeModulation Reference Signal (DMRS), a Non-Zero Power Chanel State Information-Reference Signal (NZP CSI-RS), and a Zero Power Chanel State Information-Reference Signal (ZP CSI-RS).

CRS is transmitted in all bands of a subframe and is used to perform demodulation of PBCH/PDCCH/PHICH/PCFICH/PDSCH. URS relating to PDSCH is transmitted in a subframe and a band that are used for transmission of PDSCH to which URS relates, and is used to demodulate PDSCH to which URS relates.

DMRS relating to EPDCCH is transmitted in a subframe and a band that are used for transmission of EPDCCH to which DMRS relates. DMRS is used to demodulate EPDCCH to which DMRS relates.

A resource for NZP CSI-RS is configured by the base station apparatus 1A. The terminal apparatus 2A performs signal measurement (channel measurement), using NZP CSI-RS, for example. A resource for ZP CSI-RS is configured by the base station apparatus 1A. With zero output, the base station apparatus 1A transmits ZP CSI-RS. The terminal apparatus 2A performs interference measurement in a resource to which NZP CSI-RS corresponds, for example.

A Multimedia Broadcast multicast service Single Frequency Network (MBSFN) RS is transmitted in all bands of the subframe used for transmitting PMCH. MBSFN RS is used to demodulate PMCH. PMCH is transmitted on the antenna port used for transmission of MBSFN RS.

Here, the downlink physical channel and the downlink physical signal are also collectively referred to as a downlink signal. The uplink physical channel and the uplink physical signal are also collectively referred to as an uplink signal. The downlink physical channels and the uplink physical channels are collectively referred to as physical channels. The downlink physical signals and the uplink physical signals are also collectively referred to as physical signals.

BCH, UL-SCH, and DL-SCH are transport channels. Channels used in the Medium Access Control (MAC) layer are referred to as transport channels. A unit of the transport channel used in the MAC layer is also referred to as a Transport Block (TB) or a MAC Protocol Data Unit (PDU). The transport block is a unit of data that the MAC layer delivers to the physical layer. In the physical layer, the transport block is mapped to a codeword and subject to coding processing or the like on a codeword basis.

Additionally, with respect to the terminal apparatus supporting Carrier Aggregation (CA), the base station apparatus can integrate and communicate multiple Component Carriers (CC) for further broadband transmission. In the carrier aggregation, one Primary Cell (PCell) and one or multiple Secondary Cells (SCell) are configured as a set of the serving cells.

Additionally, in Dual Connectivity (DC), as a group of the serving cells, a Master Cell Group (MCG) and a Secondary Cell Group (SCG) are configured. The MCG is configured of the PCell and optional one or multiple SCells. Additionally, the SCG is configured of a primary SCell (PSCell) and optional one or multiple SCells.

Figure 2:
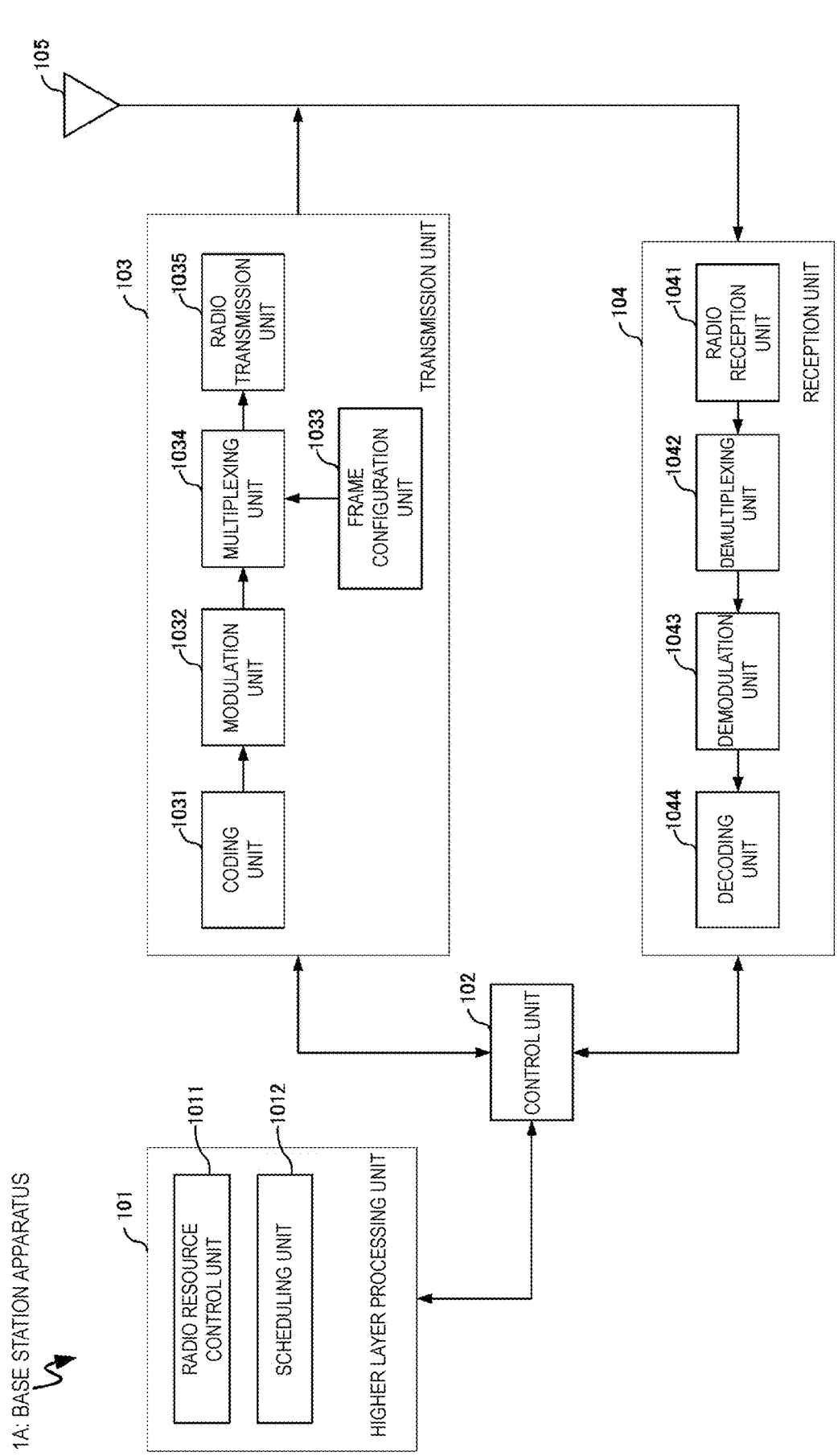
FIG. 2 is a block diagram illustrating a configuration example of a base station apparatus according to an aspect of the present invention.

FIG. 2 is a schematic block diagram illustrating a configuration of the base station apparatus 1A according to the present embodiment. As illustrated in FIG. 2, the base station apparatus 1A is configured, including a higher layer processing unit (higher layer processing step) 101, a control unit (controlling step) 102, a transmission unit (transmitting step) 103, a reception unit (receiving step) 104, and an antenna 105. The higher layer processing unit 101 is configured, including a radio resource control unit (radio resource controlling step) 1011 and a scheduling unit (scheduling step) 1012. The transmission unit 103 is configured, including a coding unit (coding step) 1031, a modulation unit (modulating step) 1032, a frame configuration unit (frame configuring step) 1033, a multiplexing unit (multiplexing step) 1034, and a radio transmission unit (radio transmitting step) 1035. The reception unit 104 is configured, including a radio reception unit (radio receiving step) 1041, a demultiplexing unit (demultiplexing step) 1042, a demodulation unit (demodulating step) 1043, and a decoding unit (decoding step) 1044.

The higher layer processing unit 101 performs processing of the Medium Access Control (MAC) layer, the Packet Data Convergence Protocol (PDCP) layer, the Radio Link Control (RLC) layer, and the Radio Resource Control (RRC) layer. Furthermore, the higher layer processing unit 101 generates information necessary for control of the transmission unit 103 and the reception unit 104, and outputs the generated information to the control unit 102.

The higher layer processing unit 101 receives information of a terminal apparatus, such as UE capability, capability information, or the like, from the terminal apparatus. To rephrase, the terminal apparatus transmits its function to the base station apparatus by higher layer signaling.

Note that in the following description, information of a terminal apparatus includes information indicating whether the stated terminal apparatus supports a prescribed function, or information indicating that the stated terminal apparatus has completed the introduction and test of a prescribed function. In the following description, information of whether the prescribed function is supported includes information of whether the introduction and test of the prescribed function have been completed.

For example, in a case where a terminal apparatus supports a prescribed function, the stated terminal apparatus transmits information (parameters) indicating whether the prescribed function is supported. In a case where a terminal apparatus does not support a prescribed function, the stated terminal apparatus does not transmit information (parameters) indicating whether the prescribed function is supported. In other words, whether the prescribed function is supported is reported by whether information (parameters) indicating whether the prescribed function is supported is transmitted. Information (parameters) indicating whether a prescribed function is supported may be reported using one bit of 1 or 0.

The radio resource control unit 1011 generates, or acquires from a higher node, the downlink data (the transport block) arranged in the downlink PDSCH, system information, the RRC message, the MAC Control Element (CE), and the like. The radio resource control unit 1011 outputs the downlink data to the transmission unit 103, and outputs other information to the control unit 102. Furthermore, the radio resource control unit 1011 manages various configuration information of the terminal apparatuses.

The scheduling unit 1012 determines a frequency and a subframe to which the physical channels (PDSCH and PUSCH) are allocated, the code rate and modulation scheme (or MCS) for the physical channels (PDSCH and PUSCH), the transmit power, and the like. The scheduling unit 1012 outputs the determined information to the control unit 102.

The scheduling unit 1012 generates the information to be used for the scheduling of the physical channels (PDSCH and PUSCH), based on the result of the scheduling. The scheduling unit 1012 outputs the generated information to the control unit 102.

Based on the information input from the higher layer processing unit 101, the control unit 102 generates a control signal for controlling of the transmission unit 103 and the reception unit 104. The control unit 102 generates the downlink control information based on the information input from the higher layer processing unit 101, and outputs the generated information to the transmission unit 103.

The transmission unit 103 generates the downlink reference signal in accordance with the control signal input from the control unit 102, codes and modulates the HARQ indicator, the downlink control information, and the downlink data that are input from the higher layer processing unit 101, multiplexes the PHICH, the PDCCH, the EPDCCH, the PDSCH, and the downlink reference signal, and transmits a signal obtained through the multiplexing to the terminal apparatus 2 through the antenna 105.

The coding unit 1031 codes the HARQ indicator, the downlink control information, and the downlink data that are input from the higher layer processing unit 101, in compliance with the coding scheme prescribed in advance, such as block coding, convolutional coding, or turbo coding, or in compliance with the coding scheme determined by the radio resource control unit 1011. The modulation unit 1032 modulates the coded bits input from the coding unit 1031, in compliance with the modulation scheme prescribed in advance, such as Binary Phase Shift Keying (BPSK), Quadrature Phase Shift Keying (QPSK), quadrature amplitude modulation (16QAM), 64QAM, or 256QAM, or in compliance with the modulation scheme determined by the radio resource control unit 2011.

The multiplexing unit 1034 multiplexes the modulated modulation symbol of each channel, the generated downlink reference signal, and the downlink control information. To be more specific, the multiplexing unit 1034 maps the modulated modulation symbol of each channel, the generated downlink reference signal, and the downlink control information to the resource elements. Note that, the downlink reference signal is generated by the transmission unit 103 based on a sequence that is already known to the terminal apparatus 2A and that is acquired in accordance with a rule prescribed in advance based on the physical cell identity (PCI, cell ID) for identifying the base station apparatus 1A, and the like.

The frame configuration unit 1033 provides a frame configuration (frame format, frame constitution, frame structure) of a transmit signal generated by the transmission unit 103. The operation of the frame configuration unit 1033 will be described later. Note that, although the following descriptions assume that the transmission unit 103 includes the frame configuration unit 1033, other configuration units may include the function of the frame configuration unit 1033, which will be described later. For example, the higher layer processing unit 101 may include the function.

The radio transmission unit 1035 performs Inverse Fast Fourier Transform (IFFT) on the modulation symbol resulting from the multiplexing or the like, generates an OFDM symbol, attaches a Cyclic Prefix (CP) to the generated OFDM symbol, generates a baseband digital signal, converts the baseband digital signal into an analog signal, removes unnecessary frequency components through filtering, up-converts a result of the removal into a signal of a carrier frequency, performs power amplification, and outputs a final result to the antenna 105 for transmission.

In accordance with the control signal input from the control unit 102, the reception unit 104 demultiplexes, demodulates, and decodes the reception signal received from the terminal apparatus 2A through the transmit and/or receive antenna 105, and outputs information resulting from the decoding to the higher layer processing unit 101.

In accordance with the control signal input from the control unit 102, the reception unit 104 demultiplexes, demodulates, and decodes the reception signal received from the terminal apparatus 2A through the antenna 105, and outputs information resulting from the decoding to the higher layer processing unit 101.

The radio reception unit 1041 converts, by down-converting, an uplink signal received through the transmit and/or receive antenna 105 into a baseband signal, removes unnecessary frequency components, controls the amplification level in such a manner as to suitably maintain a signal level, performs orthogonal demodulation based on an in-phase component and an orthogonal component of the received signal, and converts the resulting orthogonally-demodulated analog signal into a digital signal.

The radio reception unit 1041 removes a portion corresponding to CP from the digital signal resulting from the conversion. The radio reception unit 1041 performs Fast Fourier Transform (FFT) on the signal from which CP has been removed, extracts a signal in the frequency domain, and outputs the resulting signal to the demultiplexing unit 1042.

The demultiplexing unit 1042 demultiplexes the signal input from the radio reception unit 1041 into PUCCH, PUSCH, and the signal such as the uplink reference signal. The demultiplexing is performed based on radio resource allocation information that is determined in advance by the base station apparatus 1A using the radio resource control unit 1011 and that is included in the uplink grant notified to each of the terminal apparatuses 2.

Furthermore, the demultiplexing unit 1042 makes a compensation of channels including PUCCH and PUSCH. The demultiplexing unit 1042 demultiplexes the uplink reference signal.

The demodulation unit 1043 performs Inverse Discrete Fourier Transform (IDFT) on PUSCH, acquires modulation symbols, and performs reception signal demodulation, that is, demodulates each of the modulation symbols of PUCCH and PUSCH, in compliance with the modulation scheme prescribed in advance, such as BPSK, QPSK, 16QAM, 64QAM, 256QAM, or the like, or in compliance with the modulation scheme that the base station apparatus 1A itself notified in advance, with the uplink grant, each of the terminal apparatuses 2.

The decoding unit 1044 decodes the coded bits of PUCCH and PUSCH, which have been demodulated, at the code rate in compliance with a coding scheme prescribed in advance, the code rate being prescribed in advance or being notified in advance with the uplink grant to the terminal apparatus 2 by the base station apparatus 1A itself, and outputs the decoded uplink data and uplink control information to the higher layer processing unit 101. In a case that PUSCH is re-transmitted, the decoding unit 1044 performs the decoding with the coded bits input from the higher layer processing unit 101 and retained in an HARQ buffer, and the demodulated coded bits.

Figure 3:
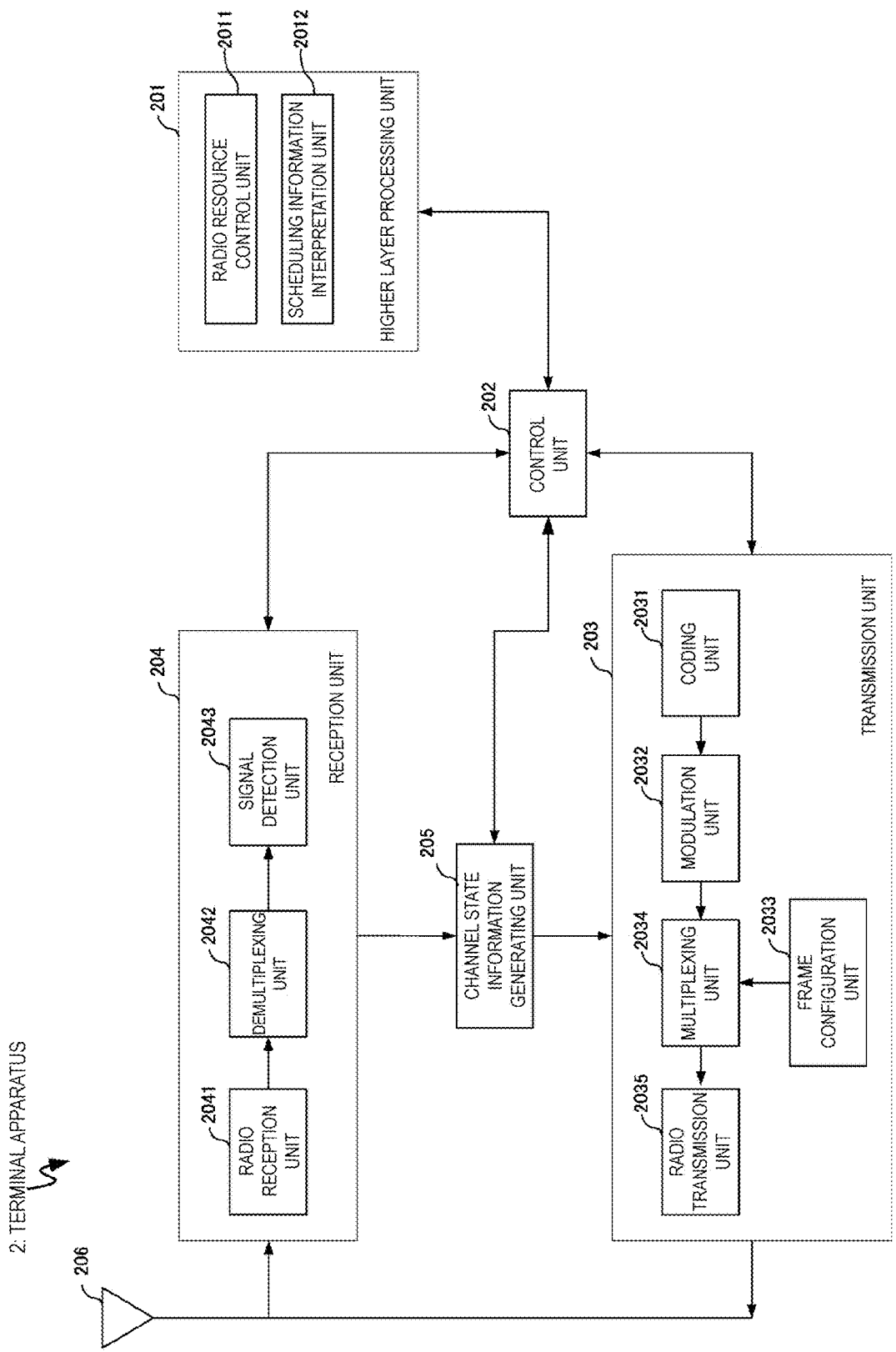
FIG. 3 is a block diagram illustrating a configuration example of a terminal apparatus according to an aspect of the present invention.

FIG. 3 is a schematic block diagram illustrating a configuration of the terminal apparatus 2 (terminal apparatus 2A and terminal apparatus 2B) according to the present embodiment. As illustrated in FIG. 3, the terminal apparatus 2A is configured, including a higher layer processing unit (higher layer processing step) 201, a control unit (controlling step) 202, a transmission unit (transmitting step) 203, a reception unit (receiving step) 204, a channel state information generating unit (channel state information generating step) 205, and an antenna 206. The higher layer processing unit 201 is configured, including a radio resource control unit (radio resource controlling stop) 2011 and a scheduling information interpretation unit (scheduling information interpreting step) 2012. The transmission unit 203 is configured, including a coding unit (coding step) 2031, a modulation unit (modulating step) 2032, a frame configuration unit (frame configuring step) 2033, a multiplexing unit (multiplexing step) 2034, and a radio transmission unit (radio transmitting step) 2035. The reception unit 204 is configured, including a radio reception unit (radio receiving step) 2041, a demultiplexing unit (demultiplexing step) 2042, and a signal detection unit (signal detecting step) 2043.

The higher layer processing unit 201 outputs the uplink data (the transport block) generated by a user operation or the like, to the transmission unit 203. The higher layer processing unit 201 performs processing of the Medium Access Control (MAC) layer, the Packet Data Convergence Protocol (PDCP) layer, the Radio Link Control (RLC) layer, and the Radio Resource Control (RRC) layer.

The higher layer processing unit 201 outputs, to the transmission unit 203, information indicating a terminal apparatus function supported by the terminal apparatus 2A itself.

Furthermore, the radio resource control unit 2011 manages various configuration information of the terminal apparatuses 2A itself. Furthermore, the radio resource control unit 2011 generates information to be mapped to each uplink channel, and outputs the generated information to the transmission unit 203.

The radio resource control unit 2011 acquires configuration information of CSI feedback transmitted from the base station apparatus, and outputs the acquired information to the control unit 202.

The scheduling information interpretation unit 2012 interprets the downlink control information received through the reception unit 204, and determines scheduling information. The scheduling information interpretation unit 2012 generates the control information in order to control the reception unit 204 and the transmission unit 203 in accordance with the scheduling information, and outputs the generated information to the control unit 202.

Based on the information input from the higher layer processing unit 201, the control unit 202 generates a control signal for controlling the reception unit 204, the channel state information generating unit 205, and the transmission unit 203. The control unit 202 outputs the generated control signal to the reception unit 204, the channel state information generating unit 205, and the transmission unit 203 to control the reception unit 204 and the transmission unit 203.

The control unit 202 controls the transmission unit 203 to transmit CSI generated by the channel state information generating unit 205 to the base station apparatus.

In accordance with the control signal input from the control unit 202, the reception unit 204 demultiplexes, demodulates, and decodes a reception signal received from the base station apparatus 1A through the antenna 206, and outputs the decoded information to the higher layer processing unit 201.

The radio reception unit 2041 converts, by down-converting, a downlink signal received through the antenna 206 into a baseband signal, removes unnecessary frequency components, controls an amplification level in such a manner as to suitably maintain a signal level, performs orthogonal demodulation based on an in-phase component and an orthogonal component of the received signal, and converts the resulting orthogonally-demodulated analog signal into a digital signal.

The radio reception unit 2041 removes a portion corresponding to CP from the digital signal resulting from the conversion, performs fast Fourier transform on the signal from which CP has been removed, and extracts a signal in the frequency domain.

The demultiplexing unit 2042 demultiplexes the extracted signal into PHICH, PDCCH, EPDCCH, PDSCH, and the downlink reference signal. Further, the demultiplexing unit 2042 makes a compensation of channels including PHICH, PDCCH, and EPDCCH based on a channel estimation value of the desired signal obtained from the channel measurement, detects the downlink control information, and outputs the information to the control unit 202. The control unit 202 outputs PDSCH and the channel estimation value of the desired signal to the signal detection unit 2043.

The signal detection unit 2043, using PDSCH and the channel estimation value, detects a signal, and outputs the detected signal to the higher layer processing unit 201.

The transmission unit 203 generates the uplink reference signal in accordance with the control signal input from the control unit 202, codes and modulates the uplink data (the transport block) input from the higher layer processing unit 201, multiplexes the PUCCH, the PUSCH, and the generated uplink reference signal, and transmits a result of the multiplexing to the base station apparatus 1A through the antenna 206.

The coding unit 2031 codes the uplink control information input from the higher layer processing unit 201 in compliance with a coding scheme, such as convolutional coding or block coding. Furthermore, the coding unit 2031 performs turbo coding in accordance with information used for the scheduling of PUSCH.

The modulation unit 2032 modulates coded bits input from the coding unit 2031, in compliance with the modulation scheme notified with the downlink control information, such as BPSK, QPSK, 16QAM, or 64QAM, or in compliance with a modulation scheme prescribed in advance for each channel.

In accordance with the control signal input from the control unit 202, the multiplexing unit 2034 rearranges modulation symbols of PUSCH in parallel and then performs Discrete Fourier Transform (DFT) on the rearranged modulation symbols. Furthermore, the multiplexing unit 2034 multiplexes PUCCH and PUSCH signals and the generated uplink reference signal for each transmit antenna port. To be more specific, the multiplexing unit 2034 maps the PUCCH and PUSCH signals and the generated uplink reference signal to the resource elements for each transmit antenna port. Note that the uplink reference signal is generated by the transmission unit 203 based on a sequence acquired according to a rule (formula) prescribed in advance, based on a physical cell identity (PCI, also referred to as a cell ID or the like) for identifying the base station apparatus 1A, a bandwidth to which the uplink reference signal is mapped, a cyclic shift notified with the uplink grant, a parameter value for generation of a DMRS sequence, and the like.

The frame configuration unit 2033 provides the frame format of the transmit signal generated by the transmission unit 203 (frame structure, frame type, frame form, frame pattern, frame generation method, frame definition), information indicating the frame format, or the frame itself in the same manner as the frame configuration unit 1033 included in the base station apparatus 1A. The operation of the frame configuration unit 2033 will be described later. Note that, it goes without saying that the function of the frame configuration unit 2033 may be included in other configuration units (for example, the higher layer processing unit 201).

The radio transmission unit 2035 performs Inverse Fast Fourier Transform (IFFT) on a signal resulting from the multiplexing, performs the modulation of SC-FDMA scheme, generates an SC-FDMA symbol, attaches CP to the generated SC-FDMA symbol, generates a baseband digital signal, converts the baseband digital signal into an analog signal, removes unnecessary frequency components, up-converts a result of the removal into a signal of a carrier frequency, performs power amplification, and outputs a final result to the transmit and/or receive antenna 206 for transmission.

The signal detection unit 2043 according to the present embodiment can perform demodulation processing based on information relating to a multiplexing state of a transmit signal addressed to the terminal apparatus itself and information relating to a re-transmission state of the transmit signal addressed to the terminal apparatus itself.

Figure 4:
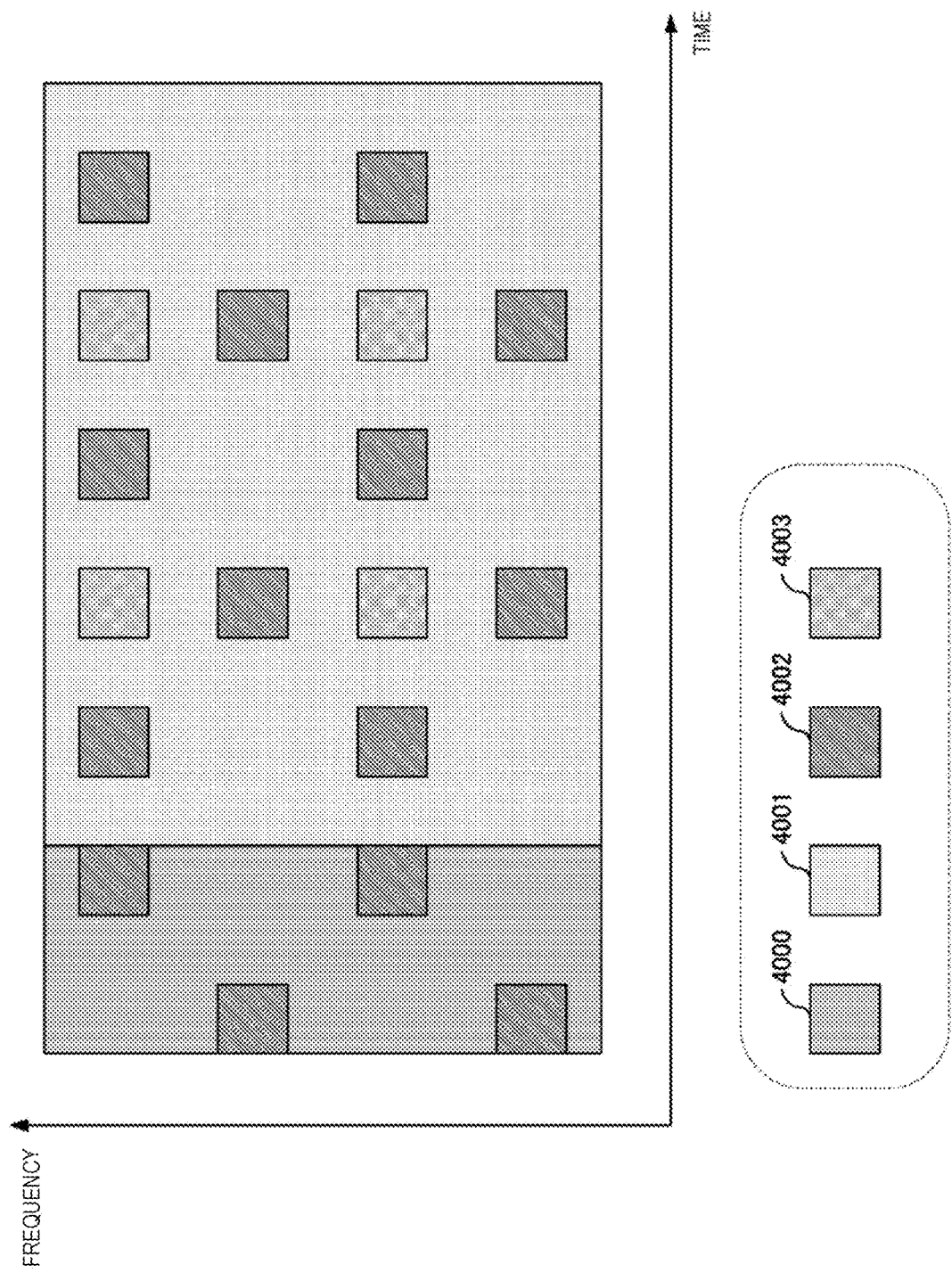
FIG. 4 is a diagram illustrating an example of a frame format according to an aspect of the present invention.

FIG. 4 is a schematic diagram illustrating an example of the frame format (first frame format, first frame structure) of the downlink signal generated by the frame configuration unit 1033 according to the present embodiment. As illustrated in FIG. 4, the first frame format includes at least any one of a control signal resource 4000, a data signal resource 4001, a common reference signal (common RS, cell-specific RS) resource 4002, a specific reference signal (specific RS, demodulation reference signal, demodulation RS, terminal-specific reference signal) resource 4003.

A signal waveform (transmission scheme) achieving the frame is not limited to any specific one, may be a multi-carrier transmission scheme represented by OFDM transmission, or a single-carrier transmission scheme represented by SC-FDMA transmission. For example, in a case of the OFDM transmission, the first frame format is configured of multiple OFDM signals.

A time length (time cycle) and a bandwidth of each of the resources are not limited to any specific one. For example, the control signal resource 4000 can include three OFDM symbol lengths as the time length, and include 12 subcarriers as the bandwidth.

Figure 5:
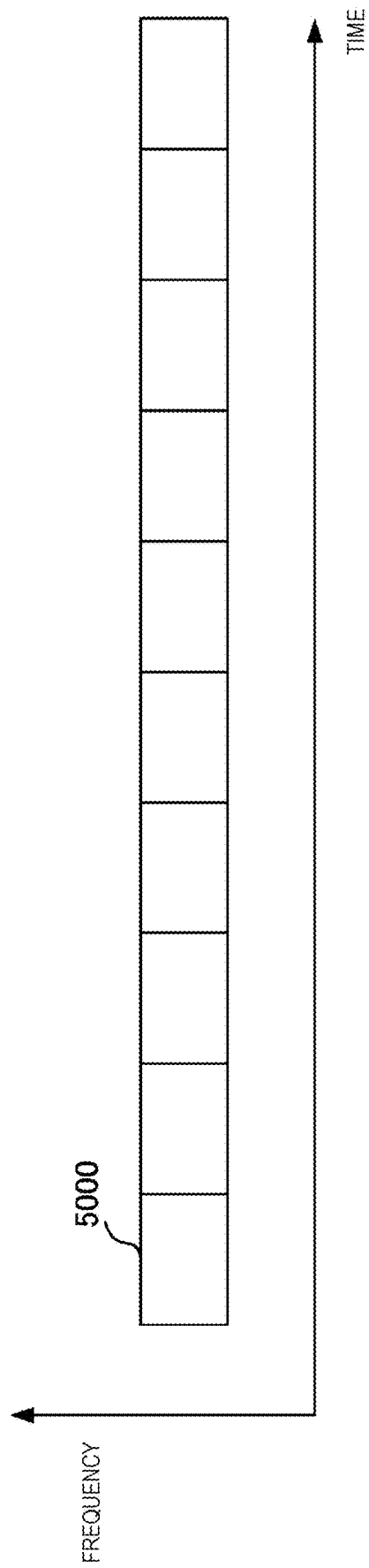
FIG. 5 is a diagram illustrating an example of a frame format according to an aspect of the present invention.

In the first frame format, aggregation in a time domain and a frequency domain can be performed. FIG. 5 is a schematic diagram illustrating an example of the frame format of the downlink signal generated by the frame configuration unit 1033 according to the present embodiment. In the example of FIG. 5, by N pieces of subframes 5000 being aggregated in the time domain, one frame is configured. The subframe 5000 can have the configuration of the first frame format illustrated in FIG. 4. Note that, according to the example of FIG. 5, although a frequency bandwidth occupied by the frame is the same as a frequency bandwidth of the subframe 5000, the frame can be configured by the subframes 5000 being aggregated in the frequency domain. For example, in a case of a configuration in which eight pieces of the subframes 5000 are arranged in the frequency domain, a frequency bandwidth occupied by the frame becomes eight times the frequency bandwidth of the subframe 5000. As illustrated in FIG. 5, in a case that the frame is configured of multiple subframes, the frame format illustrated in FIG. 4 is also referred to as a first subframe format, and the frame format illustrated in FIG. 5 is also referred to as a first frame format.

Note that, in the present embodiment, although binding multiple subframes to form one frame is referred to as aggregation, the frame configuration unit 1033 can define a frame format generated by arranging multiple subframes in the time domain and the frequency domain as one frame format from the beginning. Additionally, the number of bundles in the time domain and/or the frequency domain may be configured as a parameter. In this case, this parameter is indicated from the base station apparatus to the terminal apparatus.

Returning to FIG. 4, the control signal resource 4000 includes control information relating to a downlink signal transmitted by the base station apparatus 1A. The control information is, for example, information transmitted on the PDCCH by the base station apparatus 1A. The control information includes common control information broadcast to all the terminal apparatuses connected to the base station apparatus 1A and specific control information individually reported to each of the terminal apparatuses connected to the base station apparatus 1A.

The data signal resource 4001 includes a data signal transmitted by the base station apparatus 1A. The data signal is, for example, information transmitted on the PDSCH by the base station apparatus 1A.

In the common RS resource 4002, a common reference signal (common RS, cell-specific reference signal) that is transmitted to all the terminal apparatuses connected to the base station apparatus 1A is mapped. The common RS is used by the terminal apparatus 2A to estimate information related to a reception quality of the terminal apparatus itself (for example, the CSI). Additionally, the common RS is also used by the terminal apparatus 2A to demodulate a signal transmitted by the control signal resource 4000. Additionally, the common RS is also used by the terminal apparatus 2A to detect the base station apparatus 1A. Additionally, the common RS is also used by the terminal apparatus 2A to perform synchronization processing (sampling synchronization, FFT synchronization) to a signal transmitted from the base station apparatus 1A.

In the specific RS resource 4003, a specific reference signal (specific RS, demodulation reference signal) that is individually transmitted to each of the terminal apparatuses 2 connected to the base station apparatus 1A is mapped. The specific RS is related to the data signal that is mapped in the data signal resource 4001 by the base station apparatus 1A and addressed to each of the terminal apparatuses. The terminal apparatus 2A can use the specific RS transmitted to the terminal apparatus itself in order to demodulate the data signal mapped in the data signal resource 4001 and addressed to the terminal apparatus itself.

As illustrated in FIG. 4, in the first frame format, the data signal resource 4001 can include the common RS resource 4002 and the specific RS resource 4003. Additionally, the frame configuration unit 1033 can arrange the common RS resource 4002 and the specific RS resource 4003 in a non-contiguous manner in the time domain and the frequency domain. Note that, the frame configuration unit 1033 may further include a control information resource 4000 in the data signal resource 4001. The control information resource 4000 included in the data signal resource 4001 by the frame configuration unit 1033 is, for example, a resource in which the EPDCCH is arranged. The resource may be time-multiplexed or frequency-multiplexed to a resource in which another signal is mapped in the data signal resource 4001.

The frame configuration unit 1033 can further include a synchronization signal resource 4004 and a broadcast signal resource 4007 in the first frame format. In the synchronization signal resource 4004 and the broadcast signal resource 4007, a synchronization signal and a broadcast signal that are broadcast to the terminal apparatus 2 capable of receiving the signal transmitted from the base station apparatus 1A are mapped. The synchronization signal is a signal for the terminal apparatus 2A to perform an initial synchronization with respect to the signal transmitted from the base station apparatus 1A, and is a Primary Synchronization Signal (PSS) or a Secondary Synchronization Signal (SSS), for example. The broadcast signal is a signal for the terminal apparatus 2A to acquire system information relating to the base station apparatus 1A, and includes, for example, information transmitted on the PBCH by the base station apparatus 1A. The frame configuration unit 1033 may not necessarily arrange the synchronization signal resource 4004 and the broadcast signal resource 4007 for all the subframes.

The base station apparatus 1A can report (indicate) resource positions where the synchronization signal resource 4004 and the broadcast signal resource 4007 are arranged (or resource candidates having arrangement possibility) to the terminal apparatus 2A. Additionally, the base station apparatus 1A and the terminal apparatus 2A can determine beforehand the resource positions where the synchronization signal resource 4004 and the broadcast signal resource 4007 are arranged (or the resource candidates having the arrangement possibility). Note that, here, the information indicating the resource position includes information indicating a time resource (subframe number, OFDM signal number, frame number, slot number, or the like), a frequency resource (subcarrier number, resource block number, frequency band number, or the like), a space resource (transmit antenna number, antenna port number, space stream number, or the like), a code resource (spread code sequence, code generation formula, code generation seed, or the like), or the like.

Note that, hereinafter, in the same manner as the above description, a case of a description that is "the base station apparatus 1A notifies the terminal apparatus 2A of information" also includes, unless otherwise noted, a state in which the information is shared beforehand between the base station apparatus 1A and the terminal apparatus 2A (or a state in which the information is determined beforehand). In general, by the base station apparatus 1A notifying the terminal apparatus 2A of the information, although overhead increases, it is possible to be compatible with a radio propagation environment that changes every moment. On the other hand, by the base station apparatus 1A and the terminal apparatus 2A sharing the information beforehand, although it may be difficult in some cases to be compatible with the radio propagation environment that changes every moment, the overhead reduces.

Figure 6:
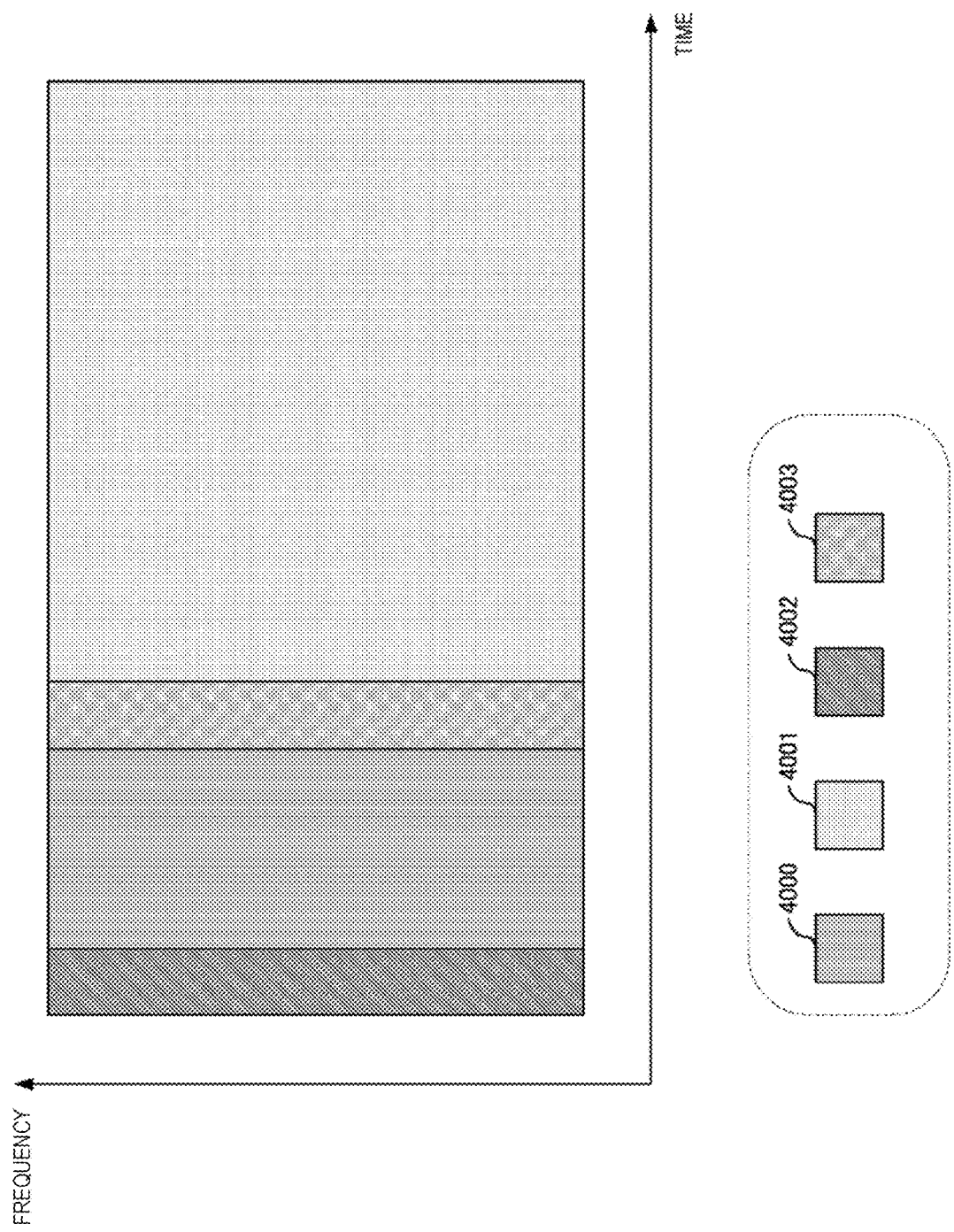
FIG. 6 is a diagram illustrating an example of a frame format according to an aspect of the present invention.

FIG. 6 is a schematic diagram illustrating an example of the frame format (second frame format, second frame structure) of the downlink signal generated by the frame configuration unit 1033 according to the present embodiment. As illustrated in FIG. 6, the second frame format includes at least any one of the control signal resource 4000, the data signal resource 4001, the common RS resource 4002, and the specific RS resource 4003.

In the second frame format, the common RS resource 4002 and the data signal resource 4001 are temporally and sequentially arranged. Additionally, in the second frame format, the common RS resource 4002 and the control signal resource 4000 are arranged in the first half of the frame. Note that, in the example illustrated in FIG. 6, although the specific RS resource 4003 is also arranged in the first half of the frame, the frame configuration unit 1033 can include the specific RS resource 4003 in the data signal resource 4001. In a case that the data signal resource 4001 includes the specific RS resource 4003, the frame configuration unit 1033 can arrange the specific RS resource 4003 in a range of the data signal resource 4001 in a non-contiguous manner in the time domain and the frequency domain.

Note that, the frame configuration unit 1033 may further include the control information resource 4000 in the data signal resource 4001. A signal mapped in the control information resource 4000 included in the data signal resource 4001 by the frame configuration unit 1033 is, for example, a signal transmitted on the EPDCCH. The control information resource 4000 may be time-multiplexed or frequency-multiplexed to a resource in which another signal is mapped in the data signal resource 4001.

The terminal apparatus 2A that receives a transmit signal generated based on the second frame format can perform initial synchronization processing on the apparatus that transmits the transmit signal by using the common RS mapped in the common RS resource 4002 arranged in the first half of the frame. In other words, the frame configuration unit 1033 according to the present embodiment can include the synchronization signal resource 4004 in the common RS resource 4002 in the second frame format. The frame configuration unit 1033 can arrange the common RS resource 4002 and the synchronization signal resource 4004 in a common resource in the second frame format. The frame configuration unit 1033 can make a part of the common RS mapped in the common RS resource 4002 a synchronization signal.

The frame configuration unit 1033 can arrange the synchronization signal resource 4004 in the first frame format and the synchronization signal in the second frame format in a common resource, or different resources. The base station apparatus 1A can make the synchronization signal transmitted by the synchronization signal resource 4004 arranged in the first frame format and the synchronization signal transmitted by the synchronization signal resource 4004 arranged in the second frame format the same signal, or can make them different signals. Here, the same signal includes that information included in the signal or a radio parameter applied to the signal is at least partially common.

In a case that the resources where the frame configuration unit 1033 arranges the synchronization signal resource 4004 (or the broadcast signal resource 4007) in the first frame format and the second frame format are different, the reception unit 204 of the terminal apparatus 2A can perform synchronization processing on the multiple resources having arrangement possibility of the synchronization signal resource 4004. Additionally, the reception unit 204 of the terminal apparatus 2A can recognize the frame format of the signal received by the terminal apparatus itself based on a result of the synchronization processing on the multiple resources. For example, in a case that the reception unit 204 of the terminal apparatus 2A performs the synchronization processing on the resources having the arrangement possibility of the synchronization signal resource 4004 in the second frame format and determines that the resources are synchronized as the result, the reception unit 204 of the terminal apparatus 2A can recognize that the frame format of the signal received by the terminal apparatus itself is the second frame format. In other words, the terminal apparatus 2A can blindly detect the frame format. According to the method described above, the terminal apparatus 2A can blindly detect the frame format by the synchronization processing.

The frame configuration unit 1033 can further include the broadcast signal resource 4007 in the second frame format. In the same manner as the first frame format, the frame configuration unit 1033 need not include the broadcast signal resource 4007 in all the transmit signal. The resource where the broadcast signal resource 4007 is arranged in the second frame format by the frame configuration unit 1033 can be the same as or different from the resource where the broadcast signal resource 4007 is arranged in the first frame format by the frame configuration unit 1033.

The base station apparatus 1A and the terminal apparatus 2A can determine beforehand resources where the synchronization signal resource 4004 and the broadcast signal resource 4007 are arranged (or resource candidates having arrangement possibility) for each of the frame formats. In this case, by the base station apparatus 1A notifying the terminal apparatus 2A of the frame format of the signal transmitted by the base station apparatus itself, the base station apparatus 1A can notify the terminal apparatus 2A of the resource or the resource candidate group.

Additionally, the base station apparatus 1A can make information included in the signal transmitted by the broadcast signal resource 4007 arranged in the first frame format and information included in the signal transmitted by the broadcast signal resource 4007 arranged in the second frame format common information, or different pieces of information. Additionally, the base station apparatus 1A can make a radio parameter (code rate, modulation scheme, code length, spread rate, or the like) of the signal transmitted by the broadcast signal resource 4007 arranged in the first frame format and a radio parameter of the signal transmitted by the broadcast signal resource 4007 arranged in the second frame format a common radio parameter, or different radio parameters.

The base station apparatus 1A can notify the terminal apparatus 2A of a resource where the frame configuration unit 1033 arranges the broadcast signal resource 4007 in the second frame format (or resource candidate having the arrangement possibility). The base station apparatus 1A can notify the terminal apparatus 2A of a resource where the broadcast signal resource 4007 is arranged in the first frame format and a resource where the broadcast signal resource 4007 is arranged in the second frame format individually.

Note that, it goes without saying that the information relating to each of the resources reported to the terminal apparatus 2A by the base station apparatus 1A can be determined beforehand between the base station apparatus 1A and the terminal apparatus 2A.

The terminal apparatus 2A connected to the base station apparatus 1A can recognize the frame format of the signal received by the terminal apparatus itself by acquiring information included in the signal transmitted by the broadcast signal resource 4007. Additionally, in a case that the frame configuration unit 1033 of the base station apparatus 1A changes the resource where the broadcast signal resource 4007 is arranged in accordance with the frame format, the reception unit 204 of the terminal apparatus 2A can perform demodulation processing of the broadcast signal on the resource having the arrangement possibility of the broadcast signal resource 4007. The terminal apparatus 2A can recognize the frame format of the signal received by the terminal apparatus itself based on information indicating the resource where the broadcast signal that can be correctly demodulated is mapped. In other words, the terminal apparatus 2A can blindly detect the frame format. According to the method described above, the terminal apparatus 2A can blindly detect the frame format by acquiring the broadcast signal.

The frame configuration unit 1033 can define the second frame format by using the frame format illustrated in FIG. 6 as a second subframe format (second subframe) and aggregating the subframes in the time domain and the frequency domain in the same manner as the first frame format. At the aggregation of the subframes, the frame configuration unit 1033 can aggregate frames including all the common RS resource 4001, the control information resource 4000, the data signal resource 4001, and the specific RS resource 4003, and can aggregate frames including resources of a specific combination among the above-described four resources. For example, at the aggregation of the frames, the frame configuration unit 1033 can aggregate only the multiple data signal resources 4001.

Figure 7:
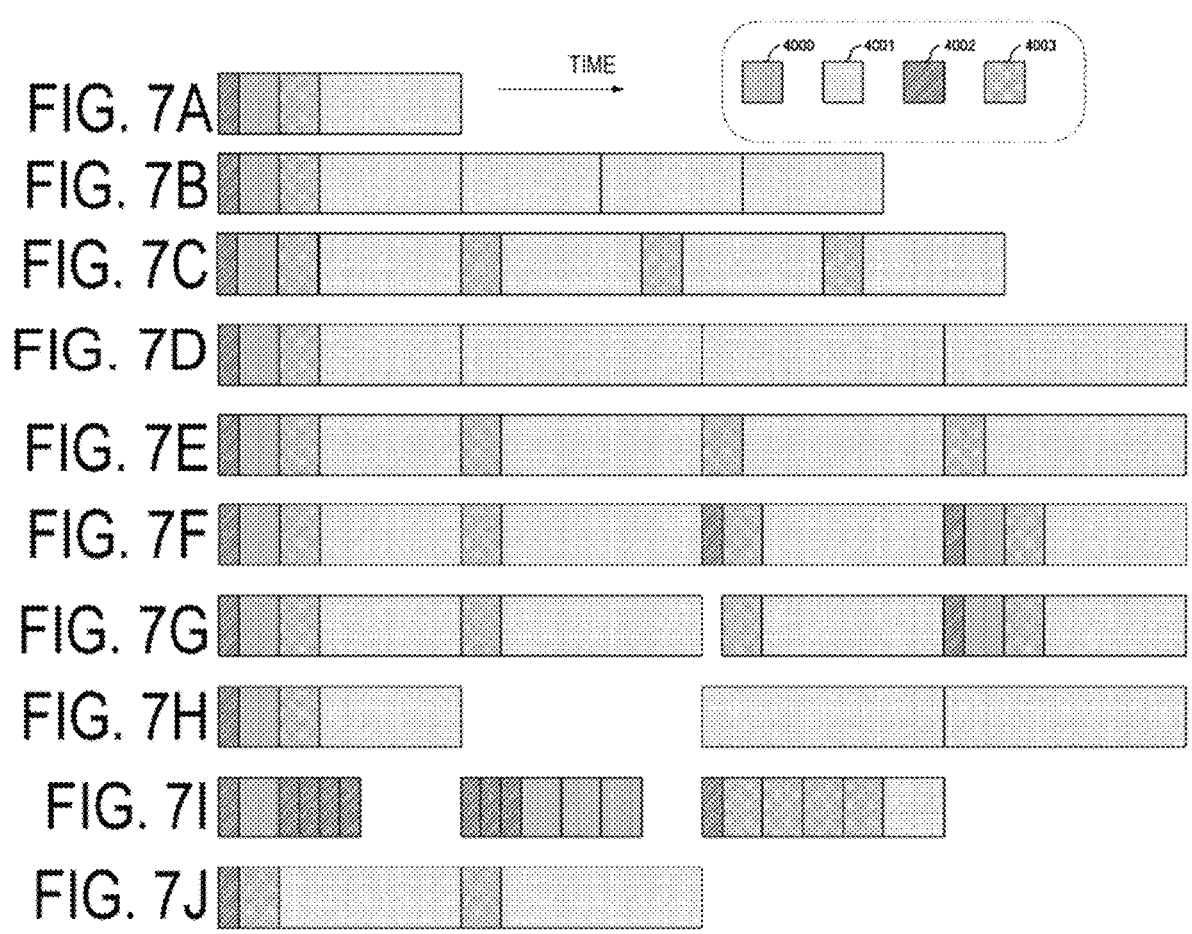
FIGS. 7A to 7J are diagrams illustrating examples of a frame format according to an aspect of the present invention.

FIGS. 7A to 7J are schematic diagrams illustrating examples of the frame format (second frame format) of the downlink signal generated by the frame configuration unit 1033 according to the present embodiment. FIG. 7A illustrates a case that the aggregation is not performed. As illustrated in FIG. 7B, the frame configuration unit 1033 can aggregate the data signal resources 4001 in the time domain. According to the example in FIG. 7B, the base station apparatus 1A can flexibly change the frame format in accordance with a data size (payload size) addressed to the terminal apparatus 2A.

As illustrated in FIG. 7C, the frame configuration unit 1033 can also aggregate the specific RS resources 4003 in the time domain in addition to the data signal resources 4001. According to FIG. 7C, the base station apparatus 1A can map data signals addressed to different terminal apparatuses 2 to the data signal resources 4001, respectively. Additionally, the specific RS is periodically mapped in the time domain, the base station apparatus 1A can therefore provide stable radio communication even to the terminal apparatus 2 under a high speed mobile environment.

As illustrated in FIG. 7D, the frame configuration unit 1033 can aggregate the data signal resources 4001 in the time domain, and can match a frame length of each of the data signal resources 4001 to be aggregated with a frame length without the aggregation (a frame length of the frame illustrated in FIG. 7A). According to FIG. 7D, even in a case that the base station apparatuses positioned in the vicinity transmit the downlink signals, with different aggregation sizes from each other, based on the second frame format, it is possible to synchronize frames between the base station apparatuses with ease. As illustrated in FIG. 7E, in a case that the specific RS resources 4003 are aggregated in the time domain in addition to the data resource signal resource 4001 as well, the frame lengths of the frames to be aggregated can of course be made uniform.

As illustrated in FIG. 7F, the frame configuration unit 1033 can further aggregate the common RS resources 4002 and the control signal resources 4000 in the time domain. Additionally, as illustrated in FIG. 7G and FIG. 7H, the frame configuration unit 1033 can include a non-transmission section (NULL section) of the base station apparatus 1A in the frame format. The length of the non-transmission section may be the same as the length of the data signal resource 4001, or may be an integral multiple of a length of an element constituting the data signal resource 4001 (for example, OFDM signal length).

As illustrated in FIG. 7I, the frame configuration unit 1033 can aggregate the control information resources 4000, the common RS resources 4002 and the specific RS resources 4003. By the frame configuration unit 1033 aggregating the common RS resources 4002, the transmission unit 103 can apply different beamforming for the common RSs that are transmitted by the common RS resources, respectively. Accordingly, for example, the terminal apparatus 2A can notify the connected base station apparatus 1A of a reception quality associated with the multiple common RSs.

As illustrated in FIG. 7J, the frame configuration unit 1033 can use the second frame format that does not include the control information resource 4000, and can also use the second frame format that does not include the control information resource 4000 and the common RS resource 4002.

As illustrated in FIG. 7J, in a case that the base station apparatus 1A transmits a signal based on the second frame format that does not include the control information resource 4000 or the common RS resource 4002, the base station apparatus 1A can transmit the second frame format that includes the control information resource 4000 or the common RS resource 4002 at another frequency. For example, the base station apparatus 1A transmits, for a signal transmitted in a high frequency band of 6 GHz or higher, the signal based on the second frame format that does not include the control information resource 4000 or the common RS resource 4002, whereas the base station apparatus 1A can transmit, for a signal transmitted in a low frequency band of lower than 6 GHz, the signal based on the second frame format that includes the control information resource 4000 or the common RS resource 4002. In this case, the base station apparatus 1A can transmit, for a signal transmitted in the low frequency band of lower than 6 GHz, the signal based on the second frame format that does not include the specific RS resource 4003 or the data signal resource 4001.

Note that, in a case that the frame configuration unit 1033 aggregates the signals generated based on the second frame format in the time domain and the frequency domain, the number of the resources in each of the resource types included in each of the signals to be aggregated (for example, the common RS resource 4001 or the data signal resource 4002) may be the same, or may be different from each other. Note that, however, from the standpoint of suppressing overhead relating to signalling from the base station apparatus 1A to the terminal apparatus 2A, the number of the resources is preferably associated with the signal lengths and the frequency bandwidths of the signals to be aggregated. Additionally, the frame lengths or the frequency bandwidths of the multiple frames to be aggregated may be a common value, or may be different values. Note that, however, from the standpoint of suppressing overhead relating to signalling from the base station apparatus 1A to the terminal apparatus 2A, a relationship between the frames in the frame lengths and the frequency bandwidths is preferably a relationship of an integral multiple.

Figure 8:
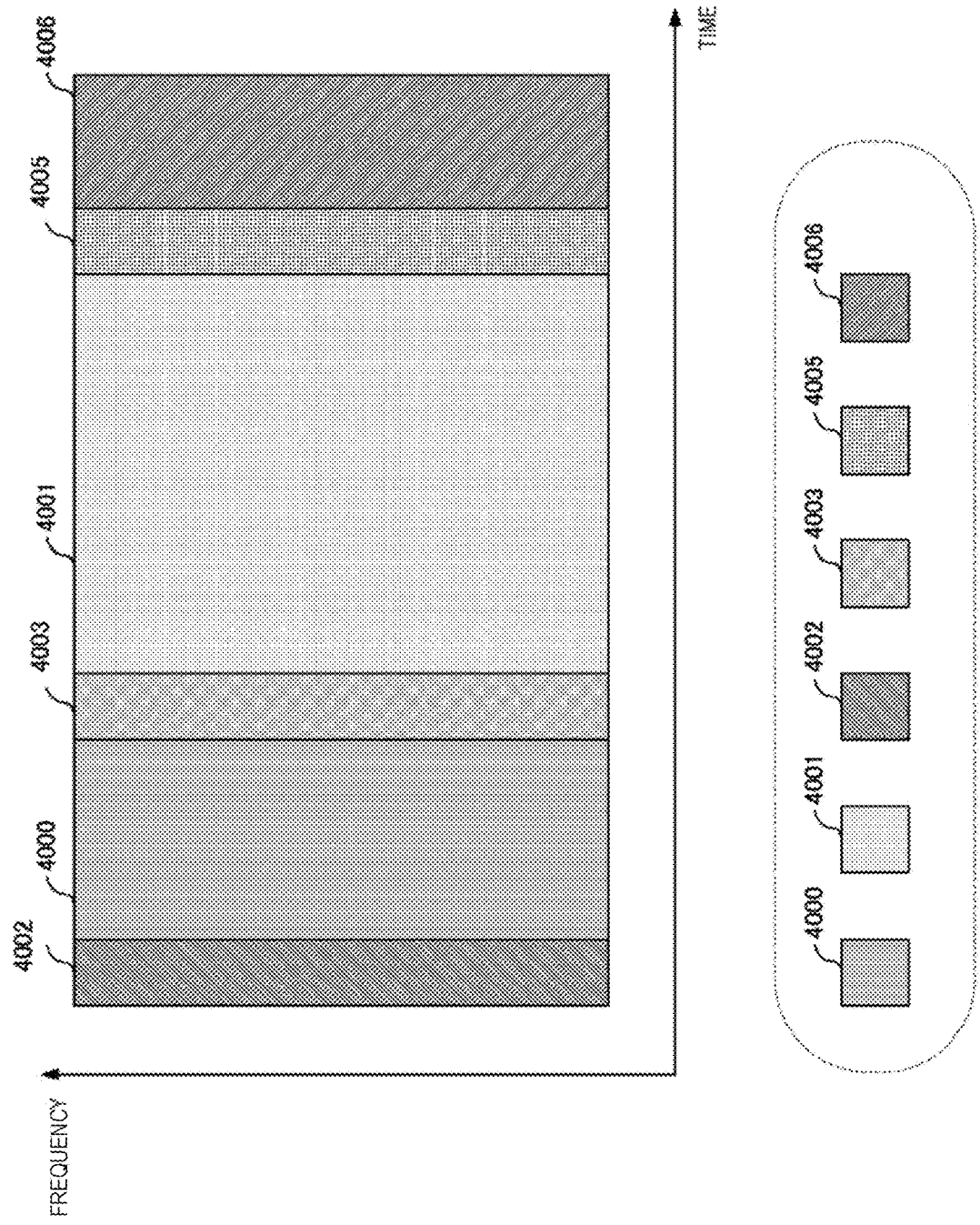
FIG. 8 is a diagram illustrating an example of a frame format according to an aspect of the present invention.

FIG. 8 is a schematic diagram illustrating a configuration example of a frame format according to the present embodiment. As illustrated in FIG. 8, the frame configuration unit 1033 can include an RF switching period 4005 and an uplink signal resource 4006 in the second frame format. The frame format illustrated in FIG. 8 can be used by the base station apparatus 1A and the terminal apparatus 2A whose duplex scheme is Time division duplex (TDD). The RF switching period 4005 is a period used by the terminal apparatus that receives a signal transmitted by the base station apparatus 1A based on the frame format to switch a reception operation of the terminal apparatus itself to a transmission operation. The base station apparatus 1A may use the RF switching period 4005 as a non-transmission period, or may transmit any signal (for example, the common RS) during the period. Note that, in order to continuously transmit the frames generated based on the second frame format, the frame configuration unit 1033 may also provide the RF switching period 4005 in the latter half of the uplink signal resource 4006, or can also configure the non-transmission section between the frames that are continuously transmitted. Note that, in a case that the second frame format is used, the base station apparatus 1A can generate a transmit signal, with a configuration of the RF switching period 4005 and the uplink signal resource 4006 in the second frame format in a case of using the TDD, and without a configuration of the RF switching period 4005 and the uplink signal resource 4006 in the second frame format in a case of using FDD, based on each of the second frame formats.

The terminal apparatus 2A that has received the transmit signal transmitted by the base station apparatus 1A based on the frame format illustrated in FIG. 8 can arrange information, which indicates reception permitted or not permitted (ACK or NACK) relating to a data signal addressed to the terminal apparatus itself mapped in the data signal resource 4001, in the uplink signal resource 4006, and transmit the information to the base station apparatus 1A. Accordingly, the base station apparatus 1A can immediately grasp whether or not the data signal addressed to the terminal apparatus 2A is correctly received, and thus a delay time relating to the transmission of the downlink signal can be reduced.

The frame configuration unit 1033 can define multiple frame formats including the first frame format and the second frame format. Additionally, the frame configuration unit 1033 can define multiple frame formats by changing a radio parameter of the first frame format and the second frame format. Here, the radio parameters include a part or all of a frequency bandwidth, a center frequency, a frequency band, a subcarrier spacing, the number of subcarriers, a symbol length, an FFT/IFFT sampling cycle, a GI length, a CP length, a frame length, a subframe length, a slot length, a TTI, the number of FFT points, a type of applied error correcting code (for example, a turbo code is applied to the first frame format, a low-density parity check code is applied to the second frame format, and the like), or the like. Additionally, in a case that different radio parameters are configured in the same frame format, each of the frame formats is also referred to as having a different type (mode). For example, in a case that a radio parameter 1 and a radio parameter 2 that have different values from each other are configured for the first frame formats, the first frame formats can be referred to as the first frame format type 1 and the first frame format type 2, respectively. Additionally, the base station apparatus can have a radio parameter set in which each of the values included in the radio parameters is configured beforehand. One or multiple radio parameter sets can be configured, by changing the radio parameter sets, the frame configuration unit 1033 can configure different frame formats/frame format types. Additionally, in a case that there are multiple radio parameter sets, each of the radio parameter sets can be configured through a simple rule. For example, in a case that there are three radio parameter sets, the subcarrier spacing of the radio parameter set 2 can be X times (X is an integer of 2 or more) the subcarrier spacing of the radio parameter set 1, the subcarrier spacing of the radio parameter set 3 can be Y times (Y is an integer of 2 or more) the subcarrier spacing of the radio parameter set 2. Note that, some of the parameters included in each of the radio parameter sets may be a common value. Additionally, the radio parameter set is transmitted (indicated) from the base station apparatus to the terminal apparatus. At this time, the terminal apparatus can learn of the frame format/frame type by radio parameter set received from the base station apparatus. Note that, hereinafter, unless otherwise stated, even in a case of a frame format, a frame format type is also included. Additionally, it can be assumed that whether or not the terminal is compatible with the above-described radio parameter set depends on a capability of the terminal.

The base station apparatus 1A according to the present embodiment can selectively or simultaneously use the multiple frame formats. Additionally, for the first frame format and the second frame format, the base station apparatus 1A can selectively configure different radio parameters, respectively, or can commonly configure some of them. The base station apparatus 1A can notify the terminal apparatus 2A of information indicating the frame format used for a transmit signal by the base station apparatus itself. Here, the information indicating the frame format includes information indicating any one of multiple frame formats defined by the base station apparatus 1A beforehand (numerical value, index, indicator), information indicating resources included in the frame format (for example, information indicating whether any of the control information resource 4000, the data signal resource 4001, the common RS resource 4002, the specific RS resource 4003 is included, or none of them is included), information indicating a resource where each of the resources is arranged and a resource candidate having arrangement possibility, or the like. The base station apparatus 1A can notify the terminal apparatus 2A of at least a part of the information indicating the frame format by signalling of a PHY layer, or by higher layer signalling of RRC signalling or the like.

The base station apparatus 1A can use the frame format in a switching manner in accordance with a use case (or usage scenario) to which the base station apparatus itself provides a communication service. Additionally, the base station apparatus 1A can use the radio parameter of the frame format in a changing manner in accordance with the usage scenario to which the base station apparatus itself provides the communication service.

In order to satisfy multiple usage scenarios, the base station apparatus 1A according to the present embodiment can include a combination of multiple frame formats (set, collection), or a combination of multiple radio parameter sets configured for the frame format (set, collection). The base station apparatus 1A can select the frame format among the frame format sets (or combination of the radio parameter sets) prepared beforehand in accordance with the use case to which the base station apparatus itself provides the communication service, and generate the transmit signal transmitted by the base station apparatus itself. The frame format collection included in the base station apparatus 1A may be common to the frame format collection included in another base station apparatus, or may be different. Additionally, the base station apparatus 1A can notify the terminal apparatus 2A connected to the base station apparatus itself of the frame format collection included in the base station apparatus itself.

The base station apparatus 1A according to the present embodiment can select multiple transmission modes in a switching manner in order to satisfy the multiple usage scenarios. Here, the transmission mode is defined by a combination of a radio parameter, a multiplexing scheme, a scheduling method, a precoding method, or the like that can be used by the transmission unit 103 of the base station apparatus 1A when generating the transmit signal. The frame formats can be allocated to the multiple transmission modes, respectively. Note that, the frame formats/radio parameters allocated to the multiple transmission modes may be all different, or some of them may be common. In this case, by selecting the transmission mode, the base station apparatus 1A can selectively use the multiple frame formats/radio parameters.

The base station apparatus 1A can selectively or simultaneously use the multiple frame formats for Enhanced mobile broadband (EMBB), Enhanced Massive machine type communication (EMTC), and Ultra-reliable and low latency communication (URLLC) as three usage scenarios. Additionally, the base station apparatus 1A can use the second frame formats with different radio parameters for the EMBB, the EMTC, and the URLLC, respectively. The frame configuration unit 1033 can select the frame format and determine the radio parameter configured to the frame format in accordance with the usage scenario to which the base station apparatus 1A provides the communication service.

For example, the base station apparatus 1A can generate the frame based on the first frame format for the downlink signal relating to the EMBB, and generate the frame based on the second frame format for the downlink signal relating to the MMTC and the URLLC. Although, in this method, the base station apparatus 1A switches the frame format in accordance with the use case (or usage scenario) to which the base station apparatus itself provides a communication service, in the method according to the present embodiment, the frame format is not necessarily limited to be defined for each use case.

The base station apparatus 1A can selectively or simultaneously use the multiple frame formats/radio parameters based on a radio medium through which the base station apparatus itself transmits the downlink signal. Here, the radio medium can include a radio resource such as a time resource, a frequency resource, or the like. Additionally, the radio medium can include a radio resource that is distinguished by a duplex scheme applied to a frequency band in which the base station apparatus 1A transmits the downlink signal.

Additionally, the radio medium can include a radio resource that is distinguished in accordance with the use case (or usage scenario) to which the base station apparatus 1A provides the communication service. The base station apparatus 1A can select the radio medium to be used in accordance with the use case (or usage scenario) provided with the communication service. The base station apparatus 1A can determine beforehand the radio medium to be used when providing the communication service to each use case (or usage scenario). Accordingly, the radio medium and the use case are associated with each other, the base station apparatus 1A can selectively or simultaneously use the multiple frame formats/radio parameters based on which use case (or usage scenario) the radio medium to be used is associated with.

The base station apparatus 1A can notify the terminal apparatus 2A of information indicating the multiple frame formats/radio parameters that are selectively or simultaneously used by the PHY layer/MAC layer or a higher layer signalling such as RRC signalling or the like based on the radio medium to which the base station apparatus itself transmits the downlink signal. Note that, the base station apparatus 1A may not necessarily notify the terminal apparatus 2A of all the information indicating the above-described multiple frame formats/radio parameters. For example, the base station apparatus 1A can notify the terminal apparatus 2A of candidates of the above-described multiple frame formats/radio parameters. In the terminal apparatus 2A, the information indicating the multiple frame formats/radio parameters that are selectively or simultaneously used by the base station apparatus 1A based on the radio medium can be subjected to signalling through the above-described method by the base station apparatus 1A, or the information can be partially and blindly detected. Note that, the terminal apparatus 2A can notify the base station apparatus 1A of information relating to the above-described multiple frame formats/radio parameters that can be received by the terminal apparatus itself.

The base station apparatus 1A can selectively or simultaneously use the multiple frame formats/radio parameters in accordance with a frequency (frequency band, channel) with which the downlink signal is transmitted. For example, the base station apparatus 1A can separate the frequencies with which the downlink signal can be transmitted into multiple groups. For example, by setting frequencies of lower than 6 GHz (Below 6 GHz) as a frequency band 1 and setting frequencies of 6 GHz or higher (Above 6 GHz) as a frequency band 2, the base station apparatus 1A can switch the frame format between a case of transmitting the downlink signal in the frequency band 1 and a case of transmitting the downlink signal in the frequency band 2 and use it. Additionally, by setting frequencies of lower than 2 GHz as a frequency band 1, setting frequencies of 2 GHz or higher and lower than 6 GHz as a frequency band 2, and setting frequencies of 6 GHz or higher as a frequency band 3, the base station apparatus 1A can generate a transmit signal based on the frame format defined by each of the frequency bands in a case of transmitting the downlink signal in each of the frequency bands.

Figure 9:
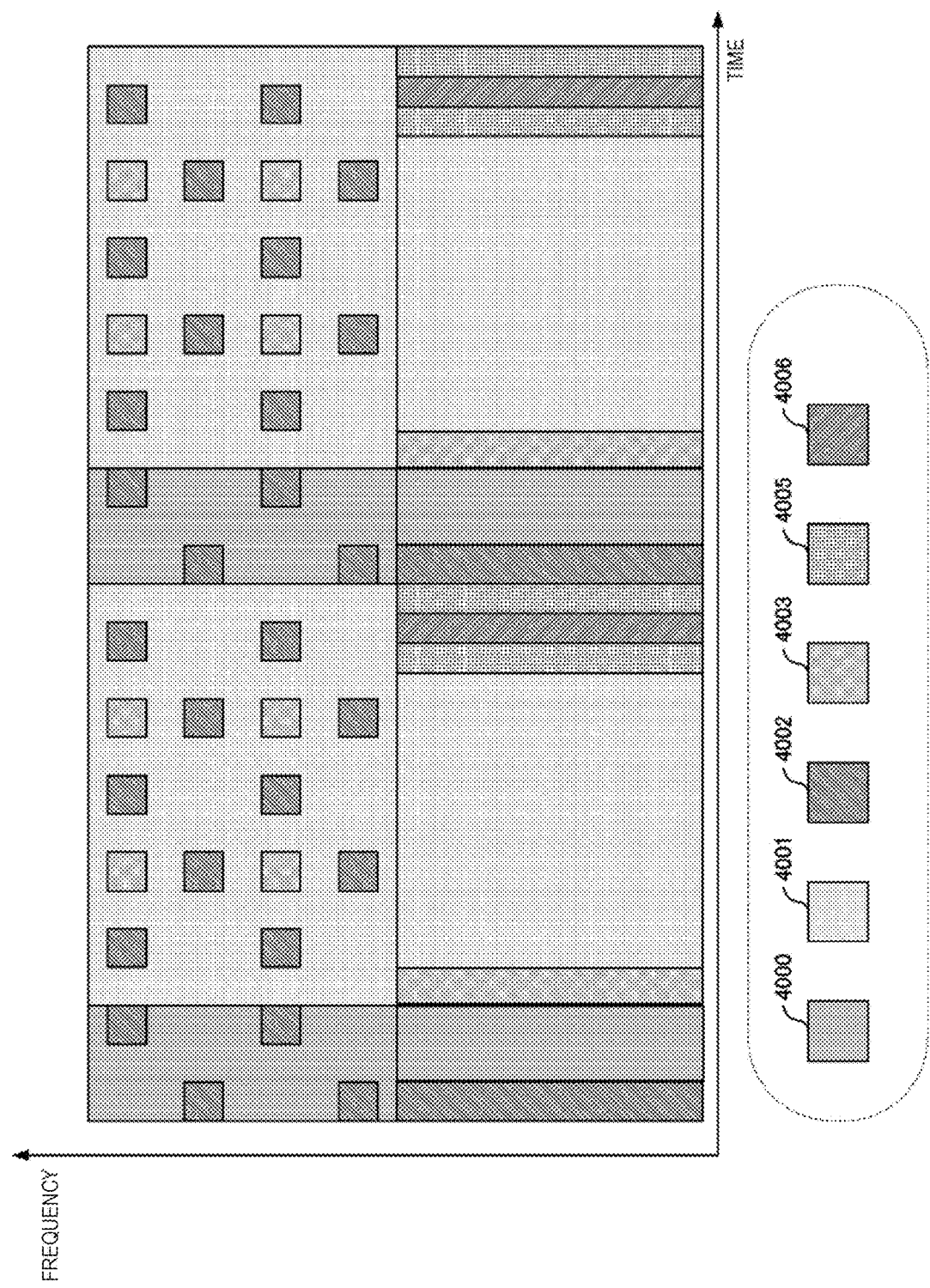
FIG. 9 is a diagram illustrating an example of a frame format according to an aspect of the present invention.

The base station apparatus 1A can simultaneously transmit signals generated based on different frame formats/radio parameters. FIG. 9 is a schematic diagram illustrating a configuration example of a downlink signal transmitted by the base station apparatus 1A according the present embodiment. According to the example in FIG. 9, the base station apparatus 1A uses different frame formats in accordance with the frequencies. The base station apparatus 1A can mix the multiple different frame formats in one OFDM signal. For example, multiple subcarriers constituting the one OFDM signal are divided into multiple subcarrier groups, the transmit signal mapped in each of the subcarrier groups is generated based on each of the different frame formats. Note that, according to the example in FIG. 9, the second frame format includes the RF switching period 4005 and the uplink signal resource 4006. Accordingly, the base station apparatus 1A can generate a signal based on the first frame format and a signal based on the second frame format by the different OFDM signals, respectively, and can frequency-multiplex and simultaneously transmit the different OFDM signals.

Note that, according to the example in FIG. 9, although the subcarrier group generated based on the first frame format and the subcarrier group generated based on the second frame format are adjacent to each other, the frame configuration unit 1033 can also arrange a guard band (null subcarrier, non-transmission frequency) between the subcarrier groups. Additionally, according to the example in FIG. 9, although frame lengths of the signals transmitted in the subcarrier group generated based on the first frame format and transmitted in the subcarrier group generated based on the second frame format, respectively, are the same, the frame lengths of the signals may be different from each other. Note that, however, from the standpoint of synchronization in a radio network, a relationship between the frame lengths of the signals respectively transmitted in the subcarrier groups is preferably a relationship of an integral multiple.

Additionally, the transmission unit 103 of the base station apparatus 1A can generate a filtered OFDM signal to which a filter is applied for each of the subcarriers, or for each of the subcarrier groups configured of multiple subcarriers. The filtered OFDM can be, for example, a Filter bank multicarrier, or Filtered OFDM. In the filtered OFDM, interference between the subcarriers (or between the subcarrier groups) is largely suppressed. The base station apparatus 1A can allocate different frame formats to multiple subcarrier groups generated by the base station apparatus itself, respectively. For example, the transmission unit 103 of the base station apparatus 1A can generate a first subcarrier group based on the first frame format, generate a second subcarrier group based on the second frame format, and generate the Filtered OFDM signal including the first subcarrier group and the second subcarrier group.

The base station apparatus 1A can define the frame format for each duplex scheme. For example, the base station apparatus 1A can define the different frame formats for a case of the FDD and a case of the TDD, respectively. The base station apparatus 1A can generate the transmit signal based on the first frame format in a case of the FDD, and, on the other hand, can generate the transmit signal based on the second frame format in a case of the TDD.

Additionally, the base station apparatus 1A can selectively use the multiple frame formats in one duplex scheme. For example, the base station apparatus 1A can selectively or simultaneously use the first frame format and the second frame format in a case using the FDD as the duplex scheme. Additionally, the base station apparatus 1A can selectively or simultaneously use the multiple radio parameters for the first frame format (or the second frame format) in one duplex scheme.

Additionally, the base station apparatus 1A can use the duplex scheme in which the FDD and the TDD coexist, and the base station apparatus 1A can define the frame format for the duplex scheme in which the FDD and the TDD coexist. Additionally, the base station apparatus 1A can selectively or simultaneously use the multiple frame formats or the radio parameters in the duplex scheme in which the FDD and the TDD coexist. As the duplex scheme in which the FDD and the TDD coexist, the base station apparatus 1A can use the duplex scheme that temporally switches the FDD and TDD by the frequency band. As the duplex scheme in which the FDD and the TDD coexist, the base station apparatus 1A can use Full duplex (or Simultaneous transmission and reception (STR)) that simultaneously performs the uplink transmission and the downlink transmission. In the STR, the base station apparatus 1A and the terminal apparatus 2A can simultaneously transmit the transmit signals generated based on different frame formats, respectively.

For the radio parameters configured to the first frame format and the second frame format, the base station apparatus 1A can configure different radio parameters between a case that the frequency band in which the transmit signal generated based on each of the frame formats is transmitted is a frequency band that is a so-called licensed band for which a radio operator obtains use permission (license) from a country or region in which the radio operator provides the service and a case that the frequency band is a frequency band that is a so-called unlicensed band that does not require the use permission from the country or region.

For the radio parameters configured to the first frame format and the second frame format, in a case that the frequency band in which the transmit signal generated based on each of the frame formats is transmitted is the unlicensed band, the base station apparatus 1A can change the radio parameter to be configured in accordance with the frequency band of the unlicensed band. For example, the base station apparatus 1A can change the radio parameter between a case that the unlicensed band in which the transmit signal is transmitted is a 5 GHz band and a case that the unlicensed band is a 60 GHz band.

The base station apparatus 1A can use a frame format that can be obtained by extending an occupied frequency bandwidth of the frame format used in the unlicensed band of 5 GHz band to an integral multiple for the unlicensed band of 60 GHz band. Additionally, the base station apparatus 1A binds multiple transmit signals generated by the frame format used for the licensed band of 6 GHz or higher in the frequency domain, and can use it for the unlicensed band of 60 GHz band. By only the base station apparatus itself and cooperating with another base station apparatus, the base station apparatus 1A can simultaneously transmit multiple component carriers generated based on the frame format used for the licensed band of 6 GHz or higher by the Carrier Aggregation (CA) and the Dual Connectivity (DC), while arranging in the unlicensed band of 60 GHz band, to the terminal apparatus 2A.

The base station apparatus 1A can use, in the unlicensed band of 60 GHz band, a frame format with a bandwidth that is the same as a channel bandwidth defined by IEEE802.11ad (for example, 2 GHz or 2.16 GHz) or with a bandwidth that is an integral multiple of the bandwidth. Additionally, the base station apparatus 1A can use a frame format for the unlicensed band of 60 GHz band or the licensed band of 6 GHz or higher, an integral multiple of (including a case of equal to) the frequency bandwidth of the frame format matching the channel bandwidth defined by IEEE802.11ad.

For the radio parameters configured to the first frame format and the second frame format, the base station apparatus 1A can configure different radio parameters between a case that the frequency band in which the transmit signal generated based on each of the frame formats is transmitted is an occupied frequency band that can be exclusively used by one radio operator and a case that the frequency band is a shared frequency band (Shared band) that is shared and used by multiple radio operators.

The base station apparatus 1A can map multiple transmit signals generated based on different frame formats in the frequency domain. In a case that the multiple transmit signals generated based on the different frame formats are mapped in the frequency domain, the base station apparatus 1A can simultaneously transmit the multiple transmit signals by the carrier aggregation (CA) in which multiple component carriers (CC) are aggregated and transmitted. Note that, the multiple CCs transmitted by the carrier aggregation can be transmitted from the multiple different base station apparatuses. Additionally, in the carrier aggregation, one Primary Cell (PCell) and one or multiple Secondary Cells (SCell) are configured as a set of the serving cells.

The base station apparatus 1A can use the different frame formats/radio parameters for the multiple CCs transmitted by the CA, respectively. For example, in a case of performing CA transmission of two CCs, the base station apparatus 1A can apply the first frame format to a first CC, and apply the second frame format to a second CC. Additionally, the base station apparatus 1A can generate a transmit signal transmitted by each CC based on the second frame format in which different radio parameters are configured. In other words, the base station apparatus 1A can configure the frame format/radio parameter for each cell. For example, the base station apparatus 1A can communicate by the first frame format in the PCell/SCell, and communicate by the second frame format in the SCell. Additionally, although the base station apparatus 1A communicate by the second frame format in the PCell and the SCell, the radio parameters to be configured can be made different for each cell.

The base station apparatus 1A can include information indicating the frame format configured to the CC to be the secondary cell in control information arranged in the control information resource 4000 included in the CC to be the primary cell.

In a case that the multiple transmit signals generated based on the different frame formats are mapped in the frequency domain, the base station apparatus 1A can transmit the transmit signals by the Dual connectivity (DC) that simultaneously transmit the signals from multiple transmission points, while cooperating with another base station apparatus. In the DC, as a group of the serving cells, a Master Cell Group (MCG) and a Secondary Cell Group (SCG) are configured. The MCG is configured of the PCell and optional one or multiple SCells. Additionally, the SCG is configured of a primary SCell (PSCell) and optional one or multiple SCells. For example, in a case that the base station apparatus 1A and a base station apparatus 1B transmit the downlink signals to the terminal apparatus 2A by the DC, the base station apparatus 1A and the base station apparatus 1B can generate transmit signals based on the different frame formats/radio parameters and transmit the generated signals, respectively. Additionally, in a case that the base station apparatus 1A and the base station apparatus 1B transmit the downlink signals to the terminal apparatus 2A by the DC, the base station apparatus 1A and the base station apparatus 1B can generate transmit signals based on the second frame formats in which different radio parameters are configured and transmit the generated signals, respectively. In other words, the base station apparatus 1A can configure the frame format/radio parameter for each cell. For example, the frame formats that are different between the PCell and the PSCell are configured, and the frame formats that are different between the PCell/PSCell and the SCell are configured. Additionally, the base station apparatuses 1A/1B can configure the second frame format in which the radio parameters that are different between the PCell and the PSCell are configured.

The base station apparatus 1A can notify the terminal apparatus 2A of information relating to the frame formats/radio parameters configured to the multiple downlink signals mapped in the frequency domain, respectively. In a case of the CA or the DC, the base station apparatus 1A can transmit information relating to the frame format/radio parameter configured for each cell to the terminal apparatus 2A.

The base station apparatus 1A can map multiple transmit signals generated based on different frame formats/radio parameters in a space direction. For example, in a case of simultaneously transmitting the downlink signals to the terminal apparatus 2A and the terminal apparatus 2B, by multiuser multiple-input and multiple-output transmission (MU-MIMO), the base station apparatus 1A can generate the transmit signal addressed to the terminal apparatus 2A and the transmit signal addressed to the terminal apparatus 2B based on different frame formats, respectively, and transmit the two transmit signals while spatially multiplexing. In other words, the transmit signal transmitted by the base station apparatus 1A according to the present embodiment can be such that transmit signals generated based on the frame formats that are different in the space direction are spatially multiplexed.

In a case that the base station apparatus 1A multiplexes the transmit signals generated based on the different frame formats in the space direction, the base station apparatus 1A can make, for each of the frame formats, at least a part of the resource where the specific RS resource 4003 is arranged as a common resource.

Additionally, in a case that the terminal apparatus 2A includes a function for removing or suppressing interference between users or interference between neighbor cells, the base station apparatus 1A can transmit assist information for removing or suppressing the interference between the users or the interference between the neighbor cells. The assist information (neighbor cell information) includes a part or all of a physical cell ID, the number of CRS ports, a $P_A$ list, $P_B$, a Multimedia Broadcast multicast service Single Frequency Network (MBSFN) subframe configuration, a transmission mode list, a resource allocation granularity, a UL/DL subframe configuration of TDD, a ZP/NZP CSI-RS configuration, quasi co-location (QCL) information, a frame format, and a radio parameter. The $P_A$ is a power ratio (power offset) of the PDSCH and the CRS in an OFDM symbol where the CRS is not allocated. The $P_B$ represents a power ratio (power offset) of the PDSCH in the OFDM symbol where the CRS is allocated and the PDSCH in the OFDM symbol where the CRS is not allocated. The QCL information is information relating to the QCL for a prescribed antenna port, a prescribed signal, or a prescribed channel. In a case that, in two antenna ports, long duration performance of a channel on which a symbol is carried on one antenna port can be estimated from a channel on which a symbol is carried on the other antenna port, these antenna ports are called the QCL. The long duration performance includes delay spread, Doppler spread, Doppler shift, average gain and/or average delay. In other words, in a case that the two antenna ports are the QCL, the terminal apparatus can consider that these antenna ports have the same long duration performance. Note that, in each of the parameters included in the assist information, one value (candidate) may be configured, or multiple values (candidates) may be configured. In the case of multiple values being configured, for the parameters, the terminal apparatus interprets values being indicated that has a possibility of being configured by the base station apparatus causing interference, and detects (specifies) a parameter configured in the interference signal among the multiple values. Additionally, the above-described assist information may indicate information of another base station apparatus/beam, or may indicate information of the base station apparatus itself/beam. In addition, the above-described assist information may be used in a case that various types of measurement are carried out. The stated measurement includes Radio Resource Management (RRM) measurement, Radio Link Monitoring (RLM) measurement, and Channel State Information (CSI) measurement.

2. Common to All Embodiments

Note that, the base station apparatus and the terminal apparatus according to an aspect of the present invention are not limited to be used in a Radio access technology (RAT) operated with the licensed band, and can be used in the Radio access technology operated with the unlicensed band. Additionally, the RAT operated with the unlicensed band can be a licensed assisted access that can receive an assistance of the licensed band.

Additionally, the base station apparatus and the terminal apparatus according to an aspect of the present invention can be used in the Dual connectivity (DC) in which signals are transmitted from (or received by) multiple transmission points (or multiple reception points). The base station apparatus and the terminal apparatus can be used for communication with at least one of the multiple transmission points (or reception points) connected with the DC. Additionally, the base station apparatus and the terminal apparatus according to an aspect of the present invention can be used in the carrier aggregation (CA) in which multiple component carriers (CCs) are used. Among the multiple CCs subjected to the CA, the base station apparatus and the terminal apparatus can be used for only the primary cell, can be used for only the secondary cell, or can be used for both the primary cell and the secondary cell.

A program running on each of the base station apparatus and the terminal apparatus according to an aspect of the present invention is a program (a program for causing a computer to operate) that controls a CPU and the like in such a manner as to realize the functions according to an aspect of the above-described embodiments of the present invention. The information handled by these devices is temporarily held in a RAM at the time of processing, and is then stored in various types of ROMs, HDDs, and the like, and read out by the CPU as necessary to be edited and written. Here, a semiconductor medium (a ROM, a non-volatile memory card, or the like, for example), an optical recording medium (DVD, MO, MD, CD, BD, or the like, for example), a magnetic recording medium (a magnetic tape, a flexible disk, or the like, for example), and the like can be given as examples of recording media for storing the programs. In addition to realizing the functions of the above-described embodiments by executing loaded programs, the functions of the present invention are realized by the programs running cooperatively with an operating system, other application programs, or the like in accordance with instructions included in those programs.

In a case that delivering these programs to market, the programs can be stored in a portable recording medium, or transferred to a server computer connected via a network such as the Internet. In this case, the storage device serving as the server computer is also included in the present invention. Furthermore, some or all portions of each of the terminal apparatus and the base station apparatus in the above-described embodiments may be realized as LSI, which is a typical integrated circuit. The functional blocks of the reception device may be individually realized as chips, or may be partially or completely integrated into a chip. In a case that the functional blocks are integrated into a chip, an integrated circuit control unit for controlling them is added.

The circuit integration technique is not limited to LSI, and the integrated circuits for the functional blocks may be realized as dedicated circuits or a multi-purpose processor. Furthermore, in a case that with advances in semiconductor technology, a circuit integration technology with which an LSI is replaced appears, it is also possible to use an integrated circuit based on the technology.

It is to be noted that the invention of the present patent application is not limited to the above-described embodiments. The terminal apparatus according to the invention of the present patent application is not limited to the application in the mobile station device, and, needless to say, can be applied to a fixed-type electronic apparatus installed indoors or outdoors, or a stationary-type electronic apparatus, for example, an AV apparatus, a kitchen apparatus, a cleaning or washing machine, an air-conditioning apparatus, office equipment, a vending machine, and other household apparatuses.

The embodiments of the invention have been described in detail thus far with reference to the drawings, but the specific configuration is not limited to the embodiments. Other designs and the like that do not depart from the essential spirit of the invention also fall within the scope of the claims.

INDUSTRIAL APPLICABILITY

The present invention can be preferably used in a base station apparatus, a terminal apparatus, and a communication method.

The present international application claims priority based on JP 2016-012184 filed on Jan. 26, 2016, and all the contents of JP 2016-012184 are incorporated in the present international application by reference.

DESCRIPTION OF REFERENCE NUMERALS 1A, 1B Base station apparatus
2, 2A, 2B Terminal apparatus
101 Higher layer processing unit
1011 Radio resource control unit
1012 Scheduling unit
102 Control unit
103 Transmission unit
1031 Coding unit
1032 Modulation unit
1033 Frame configuration unit
1034 Multiplexing unit
1035 Radio transmission unit
104 Reception unit
1041 Radio reception unit
1042 Demultiplexing unit
1043 Demodulation unit
1044 Decoding unit
105 Antenna
201 Higher layer processing unit
202 Control unit
203 Transmission unit
204 Reception unit
205 Channel state information generating unit
206 Antenna
2011 Radio resource control unit
2012 Scheduling information interpretation unit
2031 Coding unit
2032 Modulation unit
2033 Frame configuration unit
2034 Multiplexing unit
2035 Radio transmission unit
2041 Radio reception unit
2042 Demultiplexing unit
2043 Signal detection unit
4000 to 4007 Resource
5000 Subframe

The invention claimed is:

1. A base station apparatus configured to communicate with a terminal apparatus, the base station apparatus comprising;
frame configuration circuitry configured to
allocate downlink data on a first radio frame structure with first subcarriers, spacing between the first subcarriers being one of a first plurality of values or on a second radio frame structure with second subcarriers, spacing between the second subcarriers being one of a second plurality of values, and
allocate a synchronization signal on the first radio frame structure and the second radio frame structure, and
radio transmission circuitry configured to transmit the downlink data and the synchronization signal, wherein
the first plurality of values includes a value that is different from each of the second plurality of values,
subcarrier spacing for the synchronization signal is different from subcarrier spacing for the downlink data in the first radio frame structure, and
the subcarrier spacing for the synchronization signal is same as the subcarrier spacing for the downlink data in the second radio frame structure.

2. The base station apparatus according to claim 1, wherein
the frame configuration circuitry is configured to multiplex the first radio frame structure and the second radio frame structure in a frequency domain.

3. The base station apparatus according to claim 1, wherein
the frame configuration circuitry is configured to configure one of the first plurality of values and one of the second plurality of values based on whether the transmission circuitry transmits the downlink data in a first frequency range or a second frequency range.

4. A terminal apparatus configured to communicate with a base station apparatus, the terminal apparatus comprising:
frame configuration circuitry configured to allocate uplink data on a first radio frame structure with first subcarriers, spacing between the first subcarriers being one of a first plurality of values or on a second radio frame structure with second subcarriers, spacing between the second subcarriers being one of a second plurality of values,
radio transmission circuitry configured to transmit the uplink data, and
radio reception circuitry configured to receive downlink data on the first radio frame structure or the second radio frame structure, and receive a synchronization signal on the first radio frame structure and the second frame structure, wherein
the first plurality of values includes a value that is different from each of the second plurality of values,
subcarrier spacing for the synchronization signal is different from subcarrier spacing for the downlink data in the first radio frame structure, and
the subcarrier spacing for the synchronization signal is same as the subcarrier spacing for the downlink data in the second radio frame structure.

5. The terminal apparatus according to claim 4, wherein the frame configuration circuitry is configured to multiplex the first radio frame structure and the second radio frame structure in a frequency domain.

6. A communication method for a base station apparatus configured to communicate with a terminal apparatus, the communication method comprising:
allocating downlink data on a first radio frame structure with first subcarriers, spacing between the first subcarriers being one of a first plurality of values or on a second radio frame structure with second subcarriers, spacing between the second subcarriers being one of a second plurality of values, allocating a synchronization signal on the first radio frame structure and the second radio frame structure, and transmitting the downlink data and the synchronization signal, wherein the first plurality of values includes a first value that is different from each of the second plurality of values, subcarrier spacing for the synchronization signal is different from subcarrier spacing for the downlink data in the first radio structure, and the subcarrier spacing for the synchronization signal is same as the subcarrier spacing for the downlink data in the second radio frame structure.

7. A communication method for a terminal apparatus configured to communicate with a base station apparatus, the communication method comprising:

allocating uplink data on a first radio frame structure with first subcarriers, spacing between the first subcarriers being one of a first plurality of values or on a second radio frame structure with second subcarriers, spacing between the second subcarriers being one of a second plurality of values, transmitting the uplink data, receiving downlink data on the first radio frame structure or the second radio frame structure, and receiving a synchronization signal on the first radio frame structure and the second radio frame structure, wherein the first plurality of values includes a first value that is different from each of the second plurality of values, subcarrier spacing for the synchronization signal is different from subcarrier spacing for the downlink data in the first radio structure, and the subcarrier spacing for the synchronization signal is same as the subcarrier spacing for the downlink data in the second radio frame structure.

* * * * *